(12) United States Patent
Tran et al.

(10) Patent No.: US 7,879,255 B2
(45) Date of Patent: Feb. 1, 2011

(54) METHOD AND COMPOSITION FOR ELECTROCHEMICALLY POLISHING A CONDUCTIVE MATERIAL ON A SUBSTRATE

(75) Inventors: Huyen Karen Tran, San Jose, CA (US); Renhe Jia, Berkeley, CA (US); You Wang, Cupertino, CA (US); Stan D. Tsai, Fremont, CA (US); Martin S. Wohlert, San Jose, CA (US); Daxin Mao, Cupertino, CA (US)

(73) Assignee: Applied Materials, Inc., Santa Clara, CA (US)

( * ) Notice: Subject to any disclaimer, the term of this patent is extended or adjusted under 35 U.S.C. 154(b) by 1125 days.

(21) Appl. No.: 11/556,593

(22) Filed: Nov. 3, 2006

(65) Prior Publication Data

US 2007/0102303 A1    May 10, 2007

Related U.S. Application Data

(60) Provisional application No. 60/774,014, filed on Feb. 16, 2006, provisional application No. 60/733,679, filed on Nov. 4, 2005.

(51) Int. Cl.
*C09K 13/00* (2006.01)
(52) U.S. Cl. .............. 252/79.1; 252/79.2; 438/692; 216/103
(58) Field of Classification Search ............. 252/79.1, 252/79.2; 438/692, 693; 216/103
See application file for complete search history.

(56) References Cited

U.S. PATENT DOCUMENTS

| | | | |
|---|---|---|---|
| 5,965,036 A * | 10/1999 | Maki et al. ............ 216/106 |
| 6,863,797 B2 | 3/2005 | Sun et al. | |
| 6,899,804 B2 | 5/2005 | Duboust et al. | |
| 7,160,432 B2 | 1/2007 | Liu et al. | |
| 2003/0216045 A1 | 11/2003 | Wang et al. | |
| 2003/0234184 A1 | 12/2003 | Liu et al. | |
| 2004/0248412 A1 | 12/2004 | Liu et al. | |
| 2005/0056537 A1 | 3/2005 | Chen et al. | |
| 2005/0092620 A1 | 5/2005 | Mavliev et al. | |
| 2005/0145507 A1 | 7/2005 | Sun et al. | |
| 2005/0164510 A1 * | 7/2005 | Ikeda et al. ............ 438/692 |
| 2005/0218010 A1 | 10/2005 | Wang et al. | |
| 2005/0263407 A1 * | 12/2005 | Brusic et al. ............ 205/684 |
| 2006/0006074 A1 | 1/2006 | Liu et al. | |
| 2006/0021974 A1 | 2/2006 | Liu et al. | |
| 2006/0102872 A1 | 5/2006 | Liu et al. | |
| 2006/0169597 A1 | 8/2006 | Liu et al. | |

(Continued)

OTHER PUBLICATIONS

PCT International Search Report and Written Opinion for PCT International Application No. PCT/US06/30381 dated Mar. 30, 2007.

*Primary Examiner*—Lan Vinh
(74) *Attorney, Agent, or Firm*—Patterson & Sheridan, LLP

(57) ABSTRACT

Polishing compositions and methods for removing conductive materials from a substrate surface are provided. The method includes providing a substrate comprising dielectric feature definitions, a barrier material disposed in the feature definitions, and a bulk conductive material disposed on the barrier material in an amount sufficient to fill feature definitions; polishing the substrate to substantially remove the bulk conductive material; polishing a residual conductive material to expose feature definitions, comprising: applying a first voltage for a first time period, wherein the first voltage is less than the critical voltage; and applying a second voltage for a second time period, wherein the second voltage is greater than the critical voltage.

2 Claims, 12 Drawing Sheets

U.S. PATENT DOCUMENTS

2006/0196778 A1 9/2006 Jia et al.
2006/0249394 A1 11/2006 Jia et al.
2006/0249395 A1 11/2006 Wang et al.

* cited by examiner

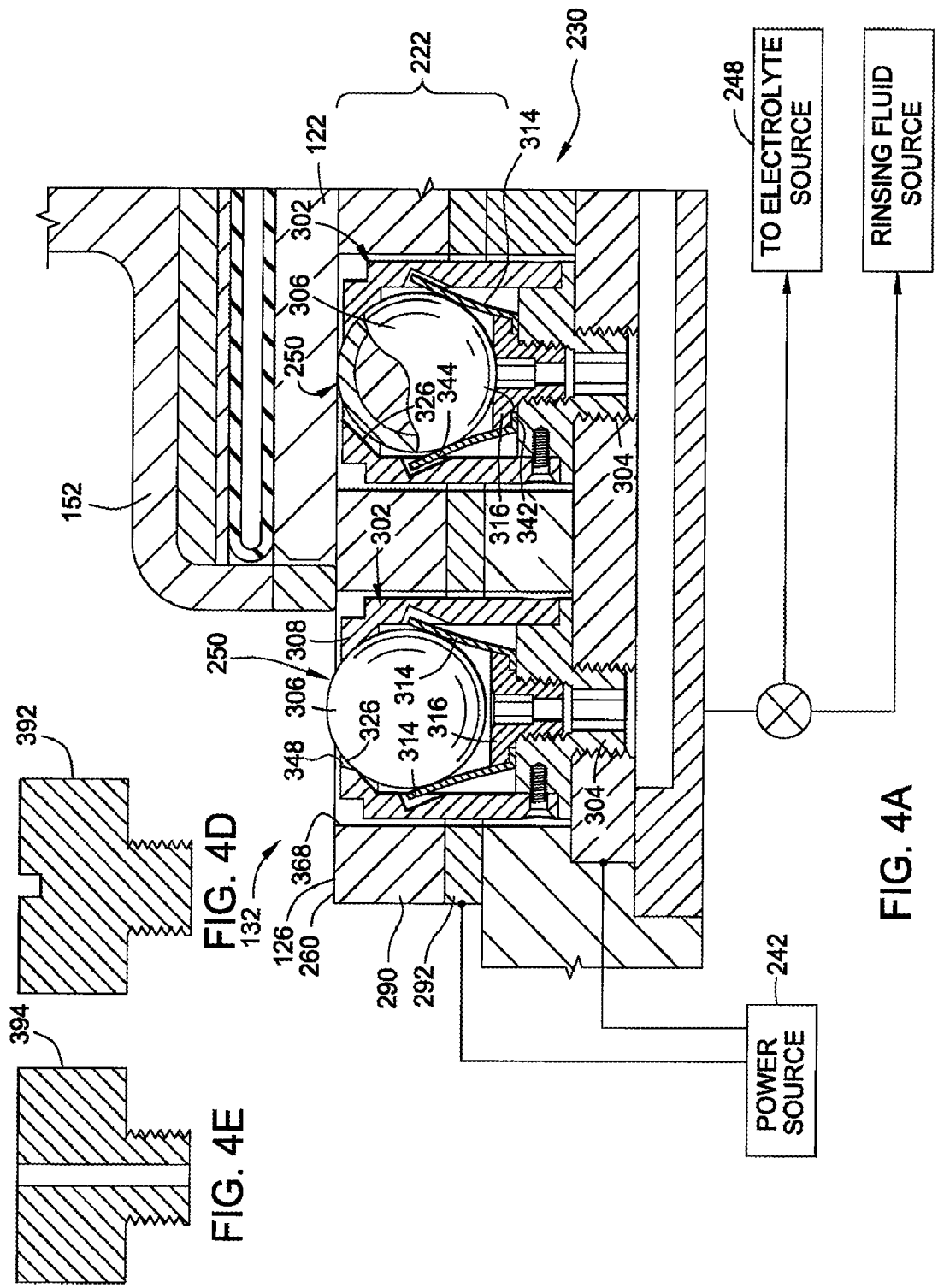

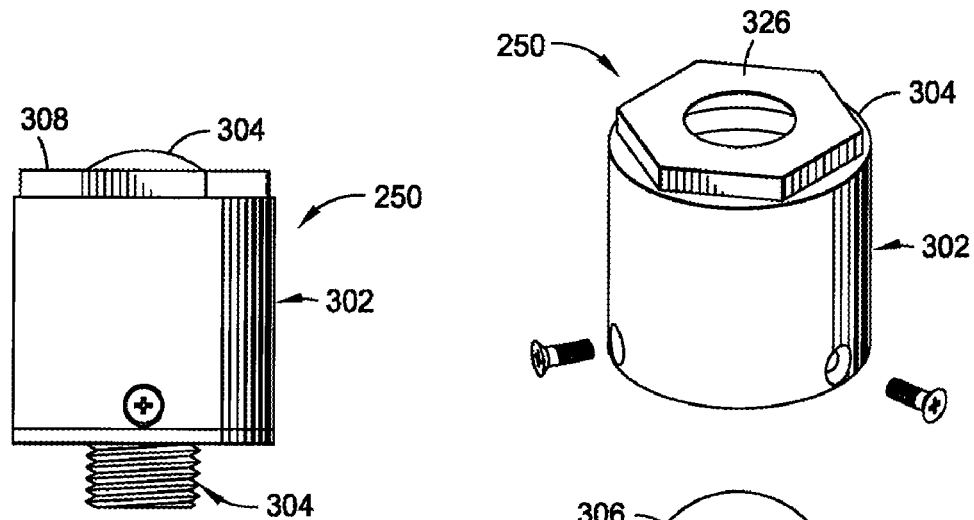
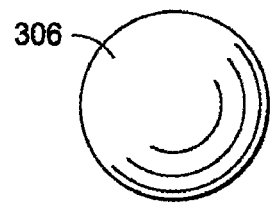
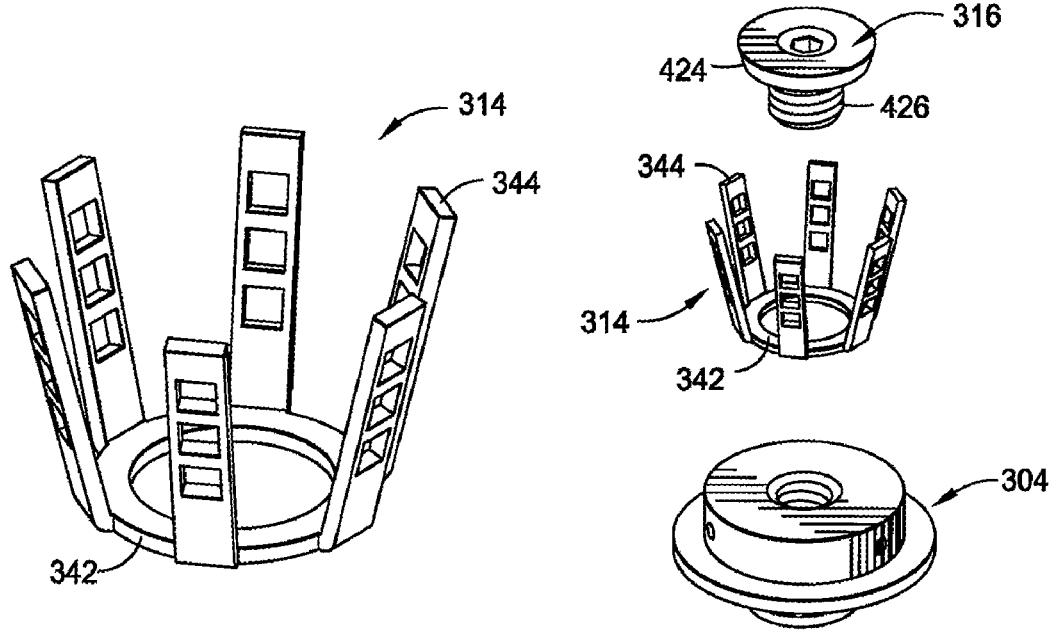
FIG. 5A
FIG. 6
FIG. 5B

METHOD AND COMPOSITION FOR ELECTROCHEMICALLY POLISHING A CONDUCTIVE MATERIAL ON A SUBSTRATE

CROSS-REFERENCE TO RELATED APPLICATIONS

This application claims benefit of U.S. provisional patent application Ser. No. 60/774,014, filed Feb. 16, 2006, and U.S. provisional patent application Ser. No. 60/733,679, filed Nov. 4, 2005, both of which are herein incorporated by reference.

BACKGROUND OF THE INVENTION

1. Field of the Invention

Embodiments of the present invention relate to methods and compositions for removing a conductive material from a substrate.

2. Background of the Related Art

Reliably producing sub-half micron and smaller features is one of the key technologies for the next generation of very large scale integration (VLSI) and ultra large-scale integration (ULSI) of semiconductor devices. However, as the limits of circuit technology are pushed, the shrinking dimensions of interconnects in VLSI and ULSI technology have placed additional demands on processing capabilities. Reliable formation of interconnects is important to VLSI and ULSI success and to the continued effort to increase circuit density and quality of individual substrates and die.

Multilevel interconnects are formed using sequential material deposition and material removal techniques on a substrate surface to form features therein. As layers of materials are sequentially deposited and removed, the uppermost surface of the substrate may become non-planar across its surface and require planarization prior to further processing. Planarization or "polishing" is a process in which material is removed from the surface of the substrate to form a generally even, planar surface. Planarization is useful in removing excess deposited material, removing undesired surface topography, and surface defects, such as surface roughness, agglomerated materials, crystal lattice damage, scratches, and contaminated layers or materials to provide an even surface for subsequent photolithography and other semiconductor manufacturing processes.

It is extremely difficult to planarize a metal surface, particularly a tungsten surface, as by chemical mechanical polishing (CMP), which planarizes a layer by chemical activity as well as mechanical activity, of a damascene inlay as shown in FIGS. 1A and 1B, with a high degree of surface planarity. A damascene inlay formation process may include etching feature definitions in an interlayer dielectric, such as a silicon oxide layer, depositing a barrier layer in the feature definitions and on a surface of the substrate, and depositing a thick layer of conductive material, such as tungsten, on the barrier layer and substrate surface. The tungsten material is chemical mechanical polished to expose the barrier layer and the tungsten filled feature definitions or "plugs." However, chemical mechanical polishing of the tungsten material to remove excess tungsten material above the substrate surface often results in topographical defects, such as dishing and erosion, that may affect subsequent processing of the substrate.

Dishing occurs when a portion of the surface of the inlaid metal of the interconnection formed in the feature definitions in the interlayer dielectric is excessively polished, resulting in one or more concave depressions, which may be referred to as concavities or recesses. Referring to FIG. 1A, a damascene inlay of conductive lines 11 and 12 are formed by depositing a metal, such as tungsten (W) or a tungsten alloy, in a damascene opening formed in an interlayer dielectric 10, for example, silicon dioxide. While not shown, a barrier layer of a suitable material such as titanium and/or titanium nitride for tungsten may be deposited between the interlayer dielectric 10 and the inlaid metal 12. Subsequent to planarization, a portion of the inlaid metal 12 may be depressed by an amount D, referred to as the amount of dishing. Dishing is more likely to occur in wider or less dense features on a substrate surface.

Conventional planarization techniques also sometimes result in erosion, characterized by excessive polishing of the layer not targeted for removal, such as a dielectric layer surrounding a filled feature definition. Referring to FIG. 1B, a tungsten fill 21 formed in a dense array of feature definitions 22 are inlaid in interlayer dielectric 20. Polishing the substrate may result in loss, or erosion E, of the dielectric 20 between the tungsten filled feature definitions. Erosion is observed to occur near narrower or more dense features formed in the substrate surface. Modifying conventional tungsten CMP polishing techniques has resulted in less than desirable polishing rates and results than is commercially acceptable.

Therefore, there is a need for methods and compositions for removing conductive material, such as excess tungsten material, from a substrate that minimizes the formation of topographical defects to the substrate during planarization.

SUMMARY OF THE INVENTION

Aspects of the invention provide compositions and methods for removing conductive materials by an electrochemical polishing technique. In one aspect, a composition is provided for removing at least a tungsten material from a substrate surface including an acid based electrolyte, a first chelating agent having a carboxylate function group, a passivating polymeric material, a second chelating agent having an amine function group, an amide function group, or combinations thereof, a pH adjusting agent to provide a pH between about 3 and about 8, and a solvent.

In another aspect, a method is provided for processing a substrate including removing a conductive layer using a process voltage below a critical voltage and removing a residual conductive material using a pulse on either side of the critical voltage.

In another aspect, a method for electrochemical mechanical polishing of a substrate is provided. The method includes providing a substrate comprising dielectric feature definitions, a barrier material disposed in the feature definitions, and a bulk conductive material disposed on the barrier material in an amount sufficient to fill feature definitions; polishing the substrate to substantially remove the bulk conductive material with a first voltage application process, polishing a residual conductive material to expose feature definitions with a second voltage application process including applying a first voltage for a first time period, wherein the first voltage is less than a critical voltage; and applying a second voltage for a second time period, wherein the second voltage is greater than the critical voltage.

BRIEF DESCRIPTION OF THE DRAWINGS

So that the manner in which the above recited aspects of the present invention are attained and can be understood in detail, a more particular description of embodiments of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 4A is a partial sectional view of the first Ecmp station through two contact assemblies;

FIGS. 4D-E are sectional views of plugs;

FIGS. 5A and 5B are side, exploded and sectional views of one embodiment of a contact assembly;

FIG. 6 is one embodiment of a contact element;

DETAILED DESCRIPTION OF THE PREFERRED EMBODIMENT

In general, aspects of the invention provide methods and compositions for removing conductive materials from a substrate surface. The invention is described below in reference to a planarizing process for the removal of conductive material and barrier material from a substrate surface by an electrochemical mechanical polishing (Ecmp) technique.

The words and phrases used herein should be given their ordinary and customary meaning in the art by one skilled in the art unless otherwise further defined. Chemical polishing should be broadly construed and includes, but is not limited to, planarizing a substrate surface using chemical activity. Electropolishing should be broadly construed and includes, but is not limited to, planarizing a substrate by the application of electrochemical activity. Electrochemical mechanical polishing (Ecmp) should be broadly construed and includes planarizing a substrate by the application of electrochemical activity, mechanical activity, and chemical activity to remove material from a substrate surface.

Anodic dissolution should be broadly construed and includes, but is not limited to, the application of an anodic bias to a substrate directly or indirectly which results in the removal of conductive material from a substrate surface and into a surrounding polishing composition. Polishing composition should be broadly construed and includes, but is not limited to, a composition that provides ionic conductivity, and thus, electrical conductivity, in a liquid medium, which generally comprises materials known as electrolyte components. The amount of each electrolyte component in polishing compositions can be measured in volume percent or weight percent. Volume percent refers to a percentage based on volume of a desired liquid component divided by the total volume of all of the liquid in the complete composition. A percentage based on weight percent is the weight of the desired component divided by the total weight of all of the liquid components in the complete composition.

The electrochemical mechanical polishing process may be performed in a process apparatus, such as a platform having one or more polishing stations adapted for electrochemical mechanical polishing processes. The one or more polishing stations may be adapted to perform conventional chemical mechanical polishing. A platen for performing an electrochemical mechanical polishing process may include a polishing article, a first electrode, and a second electrode, wherein the substrate is in electrical contact with the second electrode. An example of a suitable system is the Reflexion Lk Ecmp™ processing system, commercially available from Applied Materials, Inc., of Santa Clara, Calif. The following apparatus description is illustrative and should not be construed or interpreted as limiting the scope of the invention.

Figure 2:
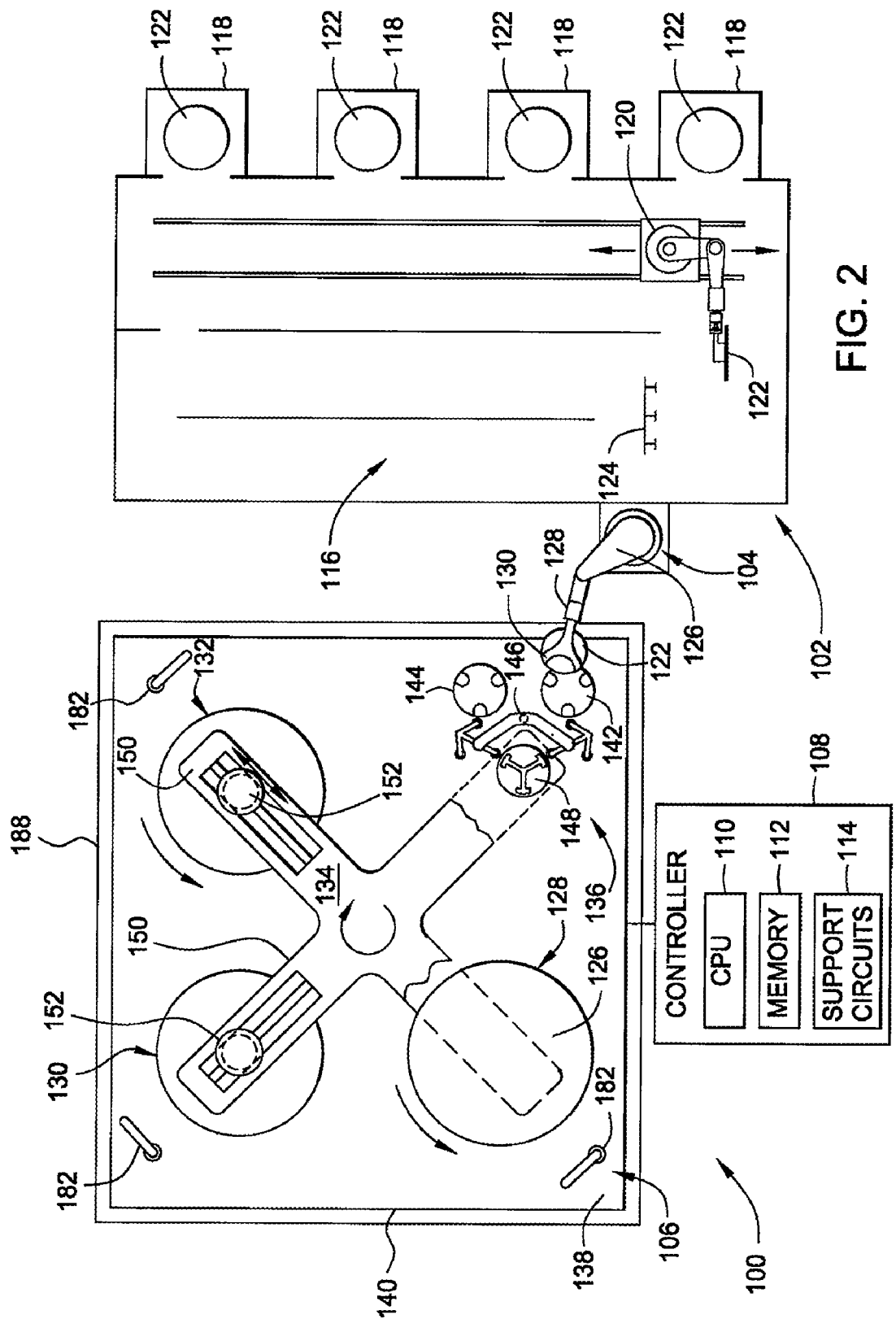
FIG. 2 is a plan view of an electrochemical mechanical planarizing system.

FIG. 2 is a plan view of one embodiment of a planarization system 100 having an apparatus for electrochemically processing a substrate. The exemplary system 100 generally comprises a factory interface 102, a loading robot 104, and a planarizing module 106. The loading robot 104 is disposed proximate the factory interface 102 and the planarizing module 106 to facilitate the transfer of substrates 122 therebetween.

A controller 108 is provided to facilitate control and integration of the modules of the system 100. The controller 108 comprises a central processing unit (CPU) 110, a memory 112, and support circuits 114. The controller 108 is coupled to the various components of the system 100 to facilitate control of, for example, the planarizing, cleaning, and transfer processes.

The factory interface 102 generally includes a cleaning module 116 and one or more wafer cassettes 118. An interface robot 120 is employed to transfer substrates 122 between the wafer cassettes 118, the cleaning module 116 and an input module 124. The input module 124 is positioned to facilitate transfer of substrates 122 between the planarizing module 106 and the factory interface 102 by grippers, for example vacuum grippers or mechanical clamps (not shown).

The planarizing module 106 includes at least a first electrochemical mechanical planarizing (Ecmp) station 128, disposed in an environmentally controlled enclosure 188. Examples of planarizing modules 106 that can be adapted to benefit from the invention include MIRRA® Chemical Mechanical Planarizing Systems, MIRRA MESA™ Chemical Mechanical Planarizing Systems, REFLEXION® Chemical Mechanical Planarizing Systems, REFLEXION® LK Chemical Mechanical Planarizing Systems, and REFLEXION LK Ecmp™ Chemical Mechanical Planarizing Systems, all available from Applied Materials, Inc. of Santa Clara, Calif. Other planarizing modules, including those that use processing pads, planarizing webs, or a combination thereof, and those that move a substrate relative to a planarizing surface in a rotational, linear or other planar motion may also be adapted to benefit from the invention.

In the embodiment depicted in FIG. 2, the planarizing module 106 includes one bulk Ecmp station 128, a second Ecmp station 130 and third polishing station 132. The third polishing station may be an Ecmp station as described for Ecmp stations 128 or 130 as shown in FIG. 2, and may alternatively, be a chemical mechanical polishing (CMP) station. As CMP stations are conventional in nature, further description thereof has been omitted for the sake of brevity. However, an example of a suitable CMP polishing station is more fully described in U.S. Pat. No. 5,738,574, issued on Apr. 14, 1998, entitled, "Continuous Processing System for Chemical Mechanical Polishing," the entirety of which is incorporated herein by reference to the extent not inconsistent with the invention.

Bulk removal of conductive material from the substrate is performed through an electrochemical dissolution process at the bulk Ecmp station 128. After the bulk material removal at the bulk Ecmp station 128, residual conductive material is removed from the substrate at the residual Ecmp station 130 through a second electrochemical mechanical process. It is contemplated that more than one residual Ecmp stations 130 may be utilized in the planarizing module 106. Barrier layer material may be removed at polishing station 132 after processing at the residual Ecmp station 130 by the barrier removal processes described herein. Alternatively, each of the first and second Ecmp stations 128, 130 may be utilized to perform both the two-step conductive material removal as described herein on a single station.

The exemplary planarizing module 106 also includes a transfer station 136 and a carousel 134 that are disposed on an upper or first side 138 of a machine base 140. In one embodiment, the transfer station 136 includes an input buffer station 142, an output buffer station 144, a transfer robot 146, and a load cup assembly 148. The input buffer station 142 receives substrates from the factory interface 102 by means of the loading robot 104. The loading robot 104 is also utilized to return polished substrates from the output buffer station 144 to the factory interface 102. The transfer robot 146 is utilized to move substrates between the buffer stations 142, 144 and the load cup assembly 148.

In one embodiment, the transfer robot 146 includes two gripper assemblies (not shown), each having pneumatic gripper fingers that hold the substrate by the substrate's edge. The transfer robot 146 may simultaneously transfer a substrate to be processed from the input buffer station 142 to the load cup assembly 148 while transferring a processed substrate from the load cup assembly 148 to the output buffer station 144. An example of a transfer station that may be used to advantage is described in U.S. Pat. No. 6,156,124, issued Dec. 5, 2000 to Tobin, which is herein incorporated by reference in its entirety.

The carousel 134 is centrally disposed on the base 140. The carousel 134 typically includes a plurality of arms 150, each supporting a planarizing head assembly 152. Two of the arms 150 depicted in FIG. 2 are shown in phantom such that the transfer station 136 and a planarizing surface 126 of the first Ecmp station 128 may be seen. The carousel 134 is indexable such that the planarizing head assemblies 152 may be moved between the planarizing stations 128, 130, 132 and the transfer station 136. One carousel that may be utilized to advantage is described in U.S. Pat. No. 5,804,507, issued Sep. 8, 1998 to Perlov, et al., which is hereby incorporated by reference in its entirety.

A conditioning device 182 is disposed on the base 140 adjacent each of the planarizing stations 128, 130, 132. The conditioning device 182 periodically conditions the planarizing material disposed in the stations 128, 130, 132 to maintain uniform planarizing results.

Figure 3:
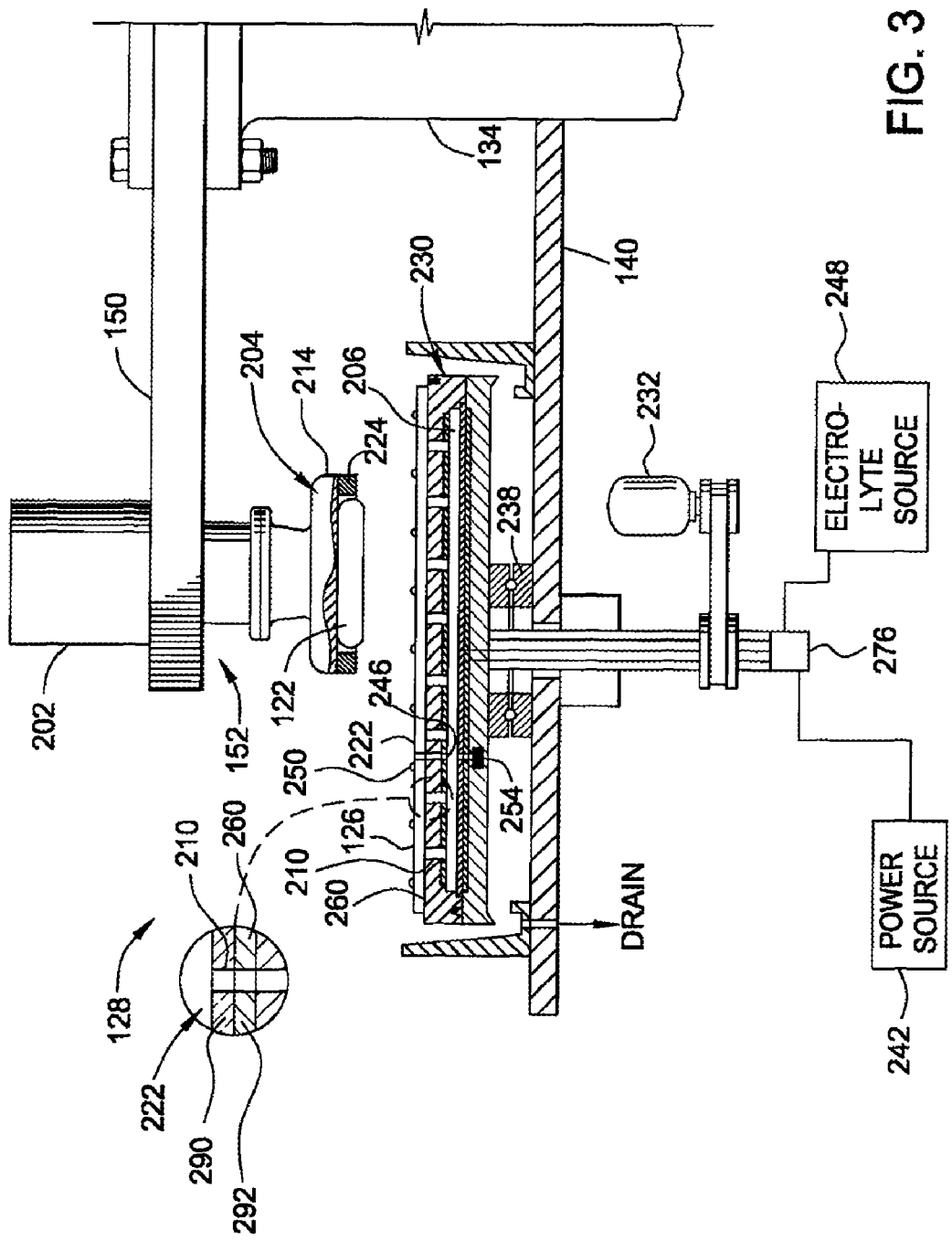
FIG. 3 is a sectional view of one embodiment of a first electrochemical mechanical planarizing (Ecmp) station of the system of FIG. 2.

FIG. 3 depicts a sectional view of one of the planarizing head assemblies 152 positioned over one embodiment of the bulk Ecmp station 128. The planarizing head assembly 152 generally comprises a drive system 202 coupled to a planarizing head 204. The drive system 202 generally provides at least rotational motion to the planarizing head 204. The planarizing head 204 additionally may be actuated toward the bulk Ecmp station 128 such that the substrate 122 retained in the planarizing head 204 may be disposed against the planarizing surface 126 of the bulk Ecmp station 128 during processing. The drive system 202 is coupled to the controller 108 that provides a signal to the drive system 202 for controlling the rotational speed and direction of the planarizing head 204.

In one embodiment, the planarizing head may be a TITAN HEAD™ or TITAN PROFILER™ wafer carrier manufactured by Applied Materials, Inc. Generally, the planarizing head 204 comprises a housing 214 and retaining ring 224 that defines a center recess in which the substrate 122 is retained. The retaining ring 224 circumscribes the substrate 122 disposed within the planarizing head 204 to prevent the substrate from slipping out from under the planarizing head 204 while processing. The retaining ring 224 can be made of plastic materials such as polyphenylene sulfide (PPS), polyetheretherketone (PEEK), and the like, or conductive materials such as stainless steel, Cu, Au, Pd, and the like, or some combination thereof. It is further contemplated that a conductive retaining ring 224 may be electrically biased to control the electric field during Ecmp. Conductive or biased retaining rings tend to slow the polishing rate proximate the edge of the substrate. It is contemplated that other planarizing heads may be utilized.

The first Ecmp station 128 generally includes a platen assembly 230 that is rotationally disposed on the base 140. The platen assembly 230 is supported above the base 140 by a bearing 238 so that the platen assembly 230 may be rotated relative to the base 140. An area of the base 140 circumscribed by the bearing 238 is open and provides a conduit for the electrical, mechanical, pneumatic, control signals and connections communicating with the platen assembly 230.

Conventional bearings, rotary unions and slip rings, collectively referred to as rotary coupler 276, are provided such that electrical, mechanical, fluid, pneumatic, control signals and connections may be coupled between the base 140 and the rotating platen assembly 230. The platen assembly 230 is typically coupled to a motor 232 that provides the rotational motion to the platen assembly 230. The motor 232 is coupled to the controller 108 that provides a signal for controlling for the rotational speed and direction of the platen assembly 230.

A top surface 260 of the platen assembly 230 supports a processing pad assembly 222 thereon. The processing pad assembly may be retained to the platen assembly 230 by magnetic attraction, vacuum, clamps, adhesives and the like.

A plenum 206 is defined in the platen assembly 230 to facilitate uniform distribution of electrolyte to the planarizing surface 126. A plurality of passages, described in greater detail below, are formed in the platen assembly 230 to allow electrolyte, provided to the plenum 206 from an electrolyte source 248, to flow uniformly though the platen assembly 230 and into contact with the substrate 122 during processing. It is contemplated that different electrolyte compositions may be provided during different stages of processing.

The processing pad assembly 222 includes an electrode 292 and at least a planarizing portion 290. The electrode 292 is typically comprised of a conductive material, such as stainless steel, copper, aluminum, gold, silver and tungsten, among others. The electrode 292 may be solid, impermeable to electrolyte, permeable to electrolyte or perforated. At least one contact assembly 250 extends above the processing pad assembly 222 and is adapted to electrically couple the substrate being processed on the processing pad assembly 222 to the power source 242. The electrode 292 is also coupled to the power source 242 so that an electrical potential may be established between the substrate and electrode 292. In one embodiment, the power source 242 is a direct current (DC) power supply. However, the power source 242 may also be an alternating current (AC) power supply. The power source 242 is particularly adapted to apply voltage or current flow through the electrolyte.

A meter (not shown) is provided to detect a metric indicative of the electrochemical process. The meter may be coupled or positioned between the power source 242 and at least one of the electrode 292 or contact assembly 250. The meter may also be integral to the power source 242. In one embodiment, the meter is configured to provide the controller 108 with a metric indicative of processing, such a charge, current and/or voltage. This metric may be utilized by the controller 108 to adjust the processing parameters in-situ or to facilitate endpoint or other process stage detection.

A window 246 is provided through the pad assembly 222 and/or platen assembly 230, and is configured to allow a sensor 254, positioned below the pad assembly 222, to sense a metric indicative of polishing performance. For example, the sensor 704 may be an eddy current sensor or an interferometer, among other sensors. The metric, provided by the sensor 254 to the controller 108, provides information that may be utilized for processing profile adjustment in-situ, endpoint detection or detection of another point in the electrochemical process. In one embodiment, the sensor 254 an interferometer capable of generating a collimated light beam, which during processing, is directed at and impinges on a side of the substrate 122 that is being polished. The interference between reflected signals is indicative of the thickness of the conductive layer of material being processed. One sensor that may be utilized to advantage is described in U.S. Pat. No. 5,893,796, issued Apr. 13, 1999, to Birang, et al., which is hereby incorporated by reference in its entirety.

Embodiments of the processing pad assembly 222 suitable for removal of conductive material from the substrate 122 may generally include a planarizing surface 126 that is substantially dielectric. Other embodiments of the processing pad assembly 222 suitable for removal of conductive material from the substrate 122 may generally include a planarizing surface 126 that is substantially conductive. At least one contact assembly 250 is provided to couple the substrate to the power source 242 so that the substrate may be biased relative to the electrode 292 during processing. Apertures 210, formed through the planarizing layer 290 and the electrode 292 and the any elements disposed below the electrode, allow the electrolyte to establish a conductive path between the substrate 122 and electrode 292.

In one embodiment, the planarizing portion 290 of the processing pad assembly 222 is a dielectric, such as polyurethane. Examples of processing pad assemblies that may be adapted to benefit from the invention are described in U.S. patent application Publication No. 2004/002310, published Feb. 5, 2004, entitled "Conductive Polishing Article For Electrochemical Mechanical Polishing," and U.S. patent application Publication No. 2004/0020789, published Feb. 5, 2004, entitled "Conductive Polishing Article For Electrochemical Mechanical Polishing," both of which are hereby incorporated by reference in their entireties.

Figure 4B:
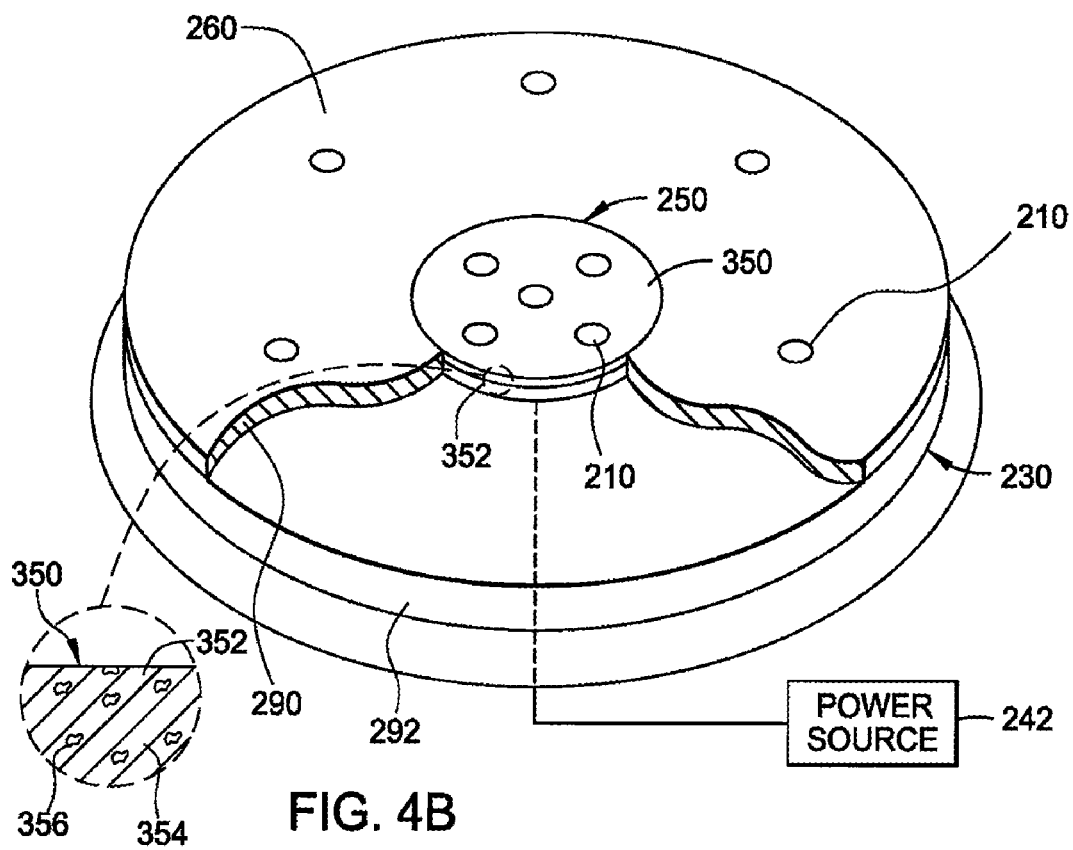
FIGS. 4B-C are sectional views of alternative embodiments of contact assemblies.
Figure 4C:
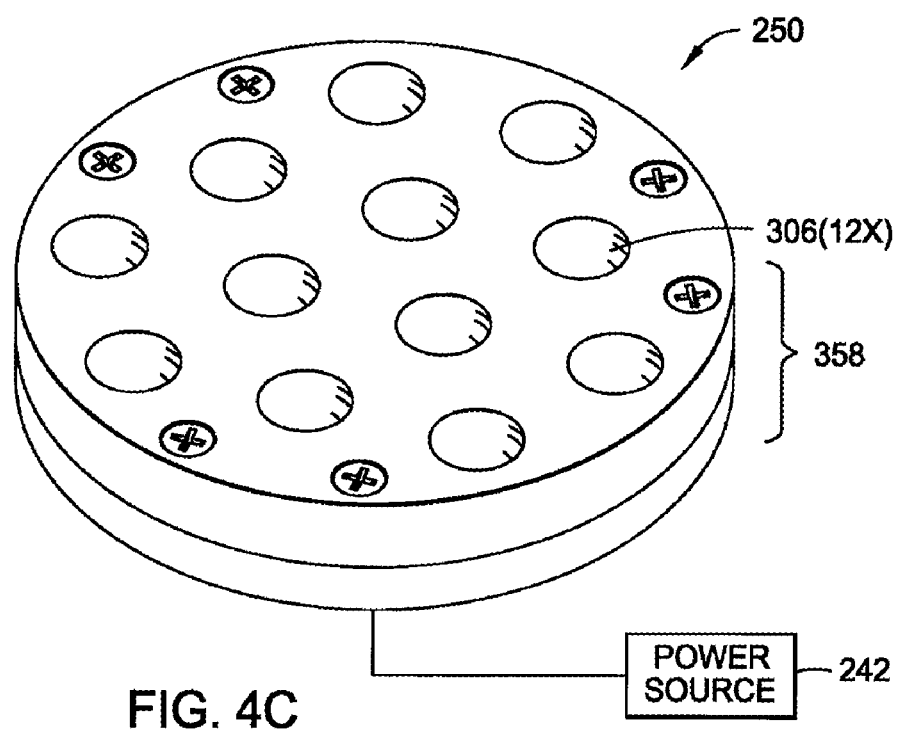

FIG. 4A is a partial sectional view of the first Ecmp station 128 through two contact assemblies 250, and FIGS. 5A-C are side, exploded and sectional views of one of the contact assemblies 250 shown in FIG. 5A. The platen assembly 230 includes at least one contact assembly 250 projecting therefrom and coupled to the power source 242 that is adapted to bias a surface of the substrate 122 during processing. The contact assemblies 250 may be coupled to the platen assembly 230, part of the processing pad assembly 222, or a separate element. Although two contact assemblies 250 are shown in FIG. 3A, any number of contact assemblies may be utilized and may be distributed in any number of configurations relative to the centerline of the platen assembly 230.

The contact assemblies 250 are generally electrically coupled to the power source 242 through the platen assembly 230 and are movable to extend at least partially through respective apertures 368 formed in the processing pad assembly 222. The positions of the contact assemblies 250 may be chosen to have a predetermined configuration across the platen assembly 230. For predefined processes, individual contact assemblies 250 may be repositioned in different apertures 368, while apertures not containing contact assemblies may be plugged with a stopper 392 or filled with a nozzle 394 (as shown in FIGS. 4D-E) that allows flow of electrolyte from the plenum 206 to the substrate. One contact assembly that may be adapted to benefit from the invention is described in U.S. patent application Publication No. 2003/0220053, published Nov. 27, 2003, by Butterfield, et al., entitled "Apparatus For Electrochemical Processing," and is hereby incorporated by reference in its entirety.

Although the embodiments of the contact assembly 250 described below with respect to FIG. 3A depicts a rolling ball contact, the contact assembly 250 may alternatively comprise a structure or assembly having a conductive upper layer or surface suitable for electrically biasing the substrate 122 during processing. For example, as depicted in FIG. 3B, the contact assembly 250 may include a pad structure 350 having an upper layer 352 made from a conductive material or a conductive composite (i.e., the conductive elements are dispersed integrally with or comprise the material comprising the upper surface), such as a polymer matrix 354 having conductive particles 356 dispersed therein or a conductive coated fabric, among others. The pad structure 350 may include one or more of the apertures 210 formed therethrough for electrolyte delivery to the upper surface of the pad assembly. Other examples of suitable contact assemblies are described in U.S. Provisional Patent Application Ser. No. 60/516,680, filed Nov. 3, 2003, by Hu, et al., which is hereby incorporated by reference in its entirety.

In one embodiment, each of the contact assemblies 250 includes a hollow housing 302, an adapter 304, a ball 306, a contact element 314 and a clamp bushing 316. The ball 306 has a conductive outer surface and is movably disposed in the housing 302. The ball 306 may be disposed in a first position having at least a portion of the ball 306 extending above the planarizing surface 126 and at least a second position where the ball 306 is substantially flush with the planarizing surface 126. It is also contemplated that the ball 306 may move completely below the planarizing surface 126. The ball 306 is generally suitable for electrically coupling the substrate 122 to the power source 242. It is contemplated that a plurality of balls 306 for biasing the substrate may be disposed in a single housing 358 as depicted in FIG. 3C.

The power source 242 generally provides a positive electrical bias to the ball 306 during processing. Between planarizing substrates, the power source 242 may optionally apply a negative bias to the ball 306 to minimize attack on the ball 306 by process chemistries.

The housing 302 is configured to provide a conduit for the flow of electrolyte from the source 248 to the substrate 122 during processing. The housing 302 is fabricated from a dielectric material compatible with process chemistries. A seat 326 formed in the housing 302 prevents the ball 306 from passing out of the first end 308 of the housing 302. The seat 326 optionally may include one or more grooves 348 formed therein that allow fluid flow to exit the housing 302 between the ball 306 and seat 326. Maintaining fluid flow past the ball 306 may minimize the propensity of process chemistries to attack the ball 306.

The contact element 314 is coupled between the clamp bushing 316 and the adapter 304. The contact element 314 is generally configured to electrically connect the adapter 304 and ball 306 substantially or completely through the range of ball positions within the housing 302. In one embodiment, the contact element 314 may be configured as a spring form.

In the embodiment depicted in FIGS. 4A-E and 5A-C and detailed in FIG. 6, the contact element 314 includes an annular base 342 having a plurality of flexures 344 extending therefrom in a polar array. The flexure 344 is generally fabricated from a resilient and conductive material suitable for use with process chemistries. In one embodiment, the flexure 344 is fabricated from gold plated beryllium copper.

Returning to FIGS. 4A and 5A-B, the clamp bushing 316 includes a flared head 424 having a threaded post 426 extending therefrom. The clamp bushing 316 may be fabricated from either a dielectric or conductive material, or a combination thereof, and in one embodiment, is fabricated from the same material as the housing 302. The flared head 424 maintains the flexures 344 at an acute angle relative to the centerline of the contact assembly 250 so that the flexures 344 of the contact elements 314 are positioned to spread around the surface of the ball 306 to prevent bending, binding and/or damage to the flexures 344 during assembly of the contact assembly 250 and through the range of motion of the ball 306.

The ball 306 may be solid or hollow and is typically fabricated from a conductive material. For example, the ball 306 may be fabricated from a metal, conductive polymer or a polymeric material filled with conductive material, such as metals, conductive carbon or graphite, among other conductive materials. Alternatively, the ball 306 may be formed from a solid or hollow core that is coated with a conductive material. The core may be non-conductive and at least partially coated with a conductive covering.

The ball 306 is generally actuated toward the planarizing surface 126 by at least one of spring, buoyant or flow forces. In the embodiment depicted in FIG. 5, flow through the passages formed through the adapter 304 and clamp bushing 316 and the platen assembly 230 from the electrolyte source 248 urge the ball 306 into contact with the substrate during processing.

Figure 7:
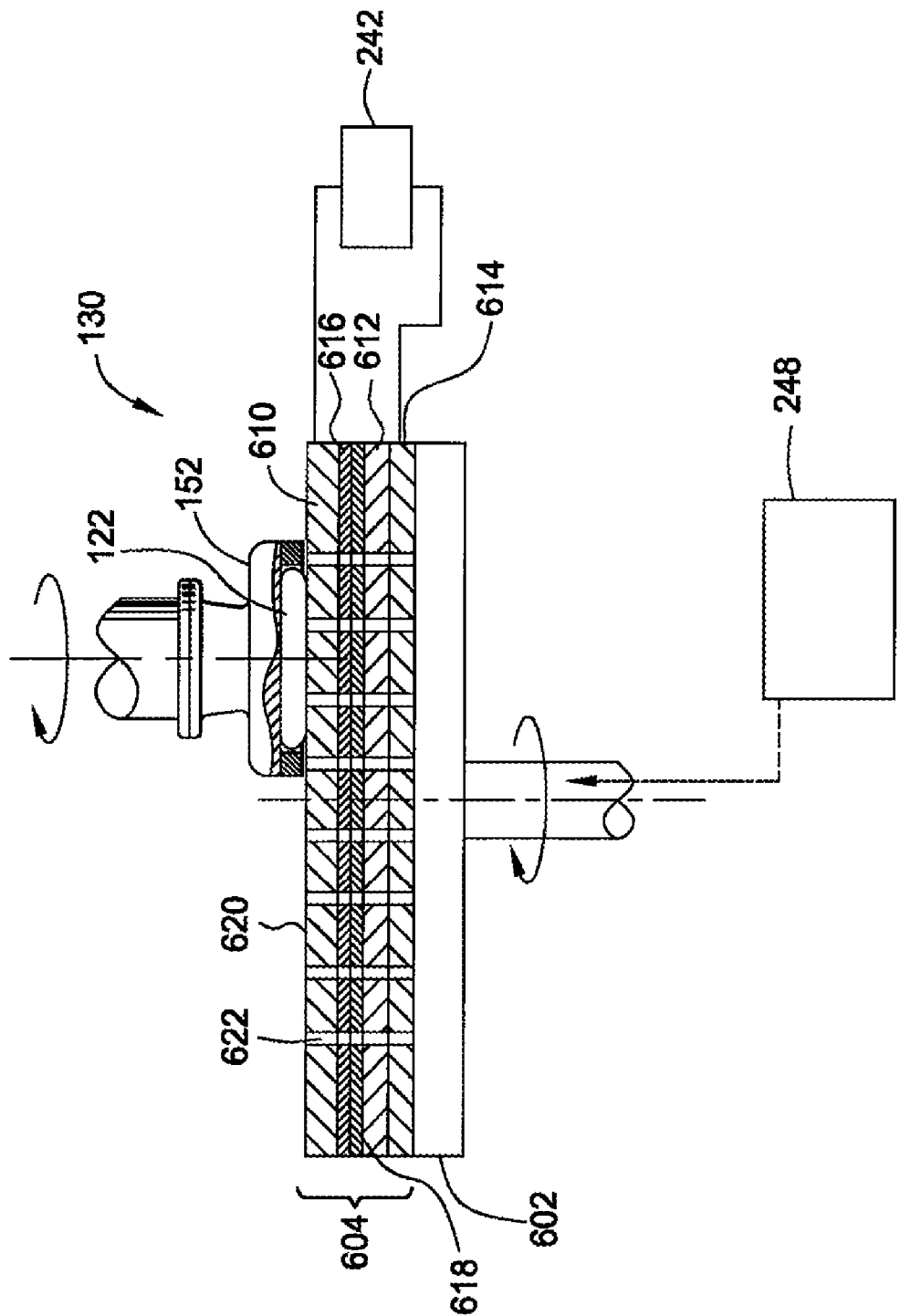
FIG. 7 is a vertical sectional view of another embodiment of an Ecmp station.

FIG. 7 is a sectional view of one embodiment of the second Ecmp station 130. The first and third Ecmp stations 128, 132 may be configured similarly. The second Ecmp station 130 generally includes a platen 602 that supports a fully conductive processing pad assembly 604. The platen 602 may be configured similar to the platen assembly 230 described above to deliver electrolyte through the processing pad assembly 604, or the platen 602 may have a fluid delivery arm (not shown) disposed adjacent thereto configured to supply electrolyte to a planarizing surface of the processing pad assembly 604. The platen assembly 602 includes at least one of a meter or sensor 254 (shown in FIG. 3) to facilitate endpoint detection.

In one embodiment, the processing pad assembly 604 includes interposed pad 612 sandwiched between a conductive pad 610 and an electrode 614. The conductive pad 610 is substantially conductive across its top processing surface and is generally made from a conductive material or a conductive composite (i.e., the conductive elements are dispersed integrally with or comprise the material comprising the planarizing surface), such as a polymer matrix having conductive particles dispersed therein or a conductive coated fabric, among others. The conductive pad 610, the interposed pad 612, and the electrode 614 may be fabricated into a single, replaceable assembly. The processing pad assembly 604 is generally permeable or perforated to allow electrolyte to pass between the electrode 614 and top surface 620 of the conductive pad 610. In the embodiment depicted in FIG. 7, the processing pad assembly 604 is perforated by apertures 622 to allow electrolyte to flow therethrough. In one embodiment, the conductive pad 610 is comprised of a conductive material disposed on a polymer matrix disposed on a conductive fiber, for example, tin particles in a polymer matrix disposed on a woven copper coated polymer. The conductive pad 610 may also be utilized for the contact assembly 250 in the embodiment of FIG. 3.

A conductive foil 616 may additionally be disposed between the conductive pad 610 and the subpad 612. The foil 616 is coupled to a power source 242 and provides uniform distribution of voltage applied by the source 242 across the conductive pad 610. In embodiments not including the conductive foil 616, the conductive pad 610 may be coupled directly, for example, via a terminal integral to the pad 610, to the power source 242. Additionally, the pad assembly 604 may include an interposed pad 618, which, along with the foil 616, provides mechanical strength to the overlying conductive pad 610. Examples of suitable pad assemblies are described in the previously incorporated U.S. patent application Publication Nos. 2004/002310 and 2004/0020789.

In one embodiment, the power source 242 is a direct current (DC) power supply. However, the power source 242 may also be an alternating current (AC) power supply. The power source 242 is particularly adapted to apply voltage or current flow through the electrolyte. Thus the power source 242 is connected by a positive (+) terminal to a first electrode and by a negative (−) terminal to a second electrode. In one embodiment, the first electrode is a conductive portion of the processing pad assembly 604, such as conductive pad 610. As a result, the substrate 122 is in direct contact with the conductive pad 610 for a portion of the polishing process. The second electrode is also a conductive portion of the conductive pad assembly 604, such as electrode 614. In contrast to the first electrode, the second electrode is not in direct physical contact with substrate 122.

Electrochemical Mechanical Processing

Methods and compositions are provided for polishing a substrate to remove conductive materials including residues, and minimize dishing within features, while increasing throughput with a decrease in polishing time. The methods may be performed by an electrochemical polishing technique. In one aspect, the method may include processing a substrate having a conductive material layer disposed over features, supplying a polishing composition as described herein to the surface of the substrate, applying a pressure between the substrate and a polishing article, providing relative motion between the substrate and the polishing article, applying a pulse bias between a first electrode and a second electrode in electrical contact with the substrate, and removing at least a portion of the conductive material from the substrate surface.

The removal of excess conductive material, such as tungsten, may be performed in one or more processing steps, for example, a single removal step or a first portion removal step and a second portion removal step. Bulk material is broadly defined herein as any material deposited on the substrate in an amount more than sufficient to substantially fill features formed on the substrate surface. Residual material is broadly defined as any material remaining after one or more bulk or residual polishing process steps. Generally, the first portion removal process is a bulk removal during a first Ecmp step to remove at least about 50% of the conductive layer, preferably at least about 70%, more preferably at least about 80%, for example, at least about 90%. The second portion removal process is a residual removal during a second Ecmp step that removes most, if not all the remaining conductive material disposed on the barrier layer to leave behind the filled plugs.

The bulk removal Ecmp step may be performed on a first polishing platen and the residual removal Ecmp step on a second polishing platen of the same or different polishing apparatus as the first platen. In another embodiment, the residual removal Ecmp step may be performed on the first platen with the bulk removal step. Any barrier material may be removed on a separate platen, such as the third platen in the apparatus described in FIG. 2. For example, the apparatus described above in accordance with the processes described herein may include three platens for removing tungsten material including, for example, a first platen to remove bulk material, a second platen for residual removal and a third platen for barrier removal, wherein the bulk and the residual processes are Ecmp processes and the barrier removal is a CMP process, or, alternatively, another Ecmp process. In another embodiment, three Ecmp platens may be used to remove bulk material, residual removal and barrier removal.

Figure 8A:
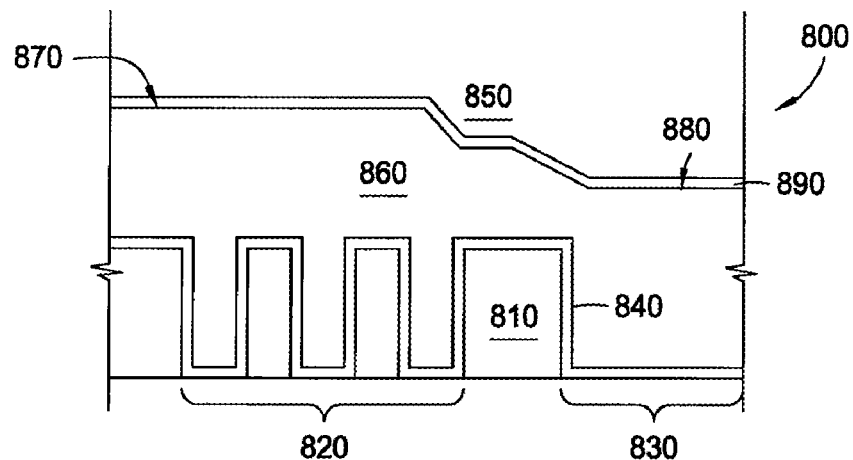
FIGS. 8A-8D are schematic cross-sectional views illustrating a polishing process performed on a substrate according to one embodiment.
Figure 8B:
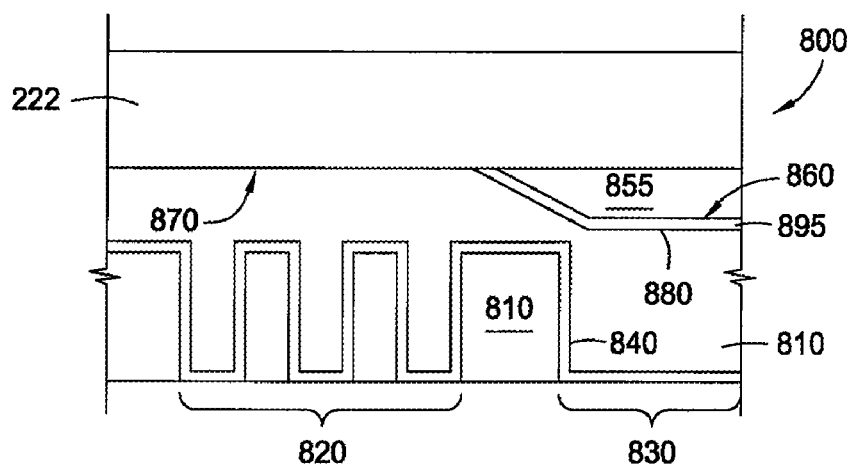
Figure 8C:
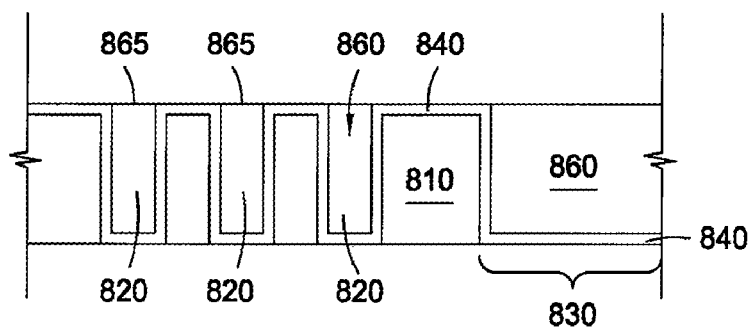
Figure 8D:
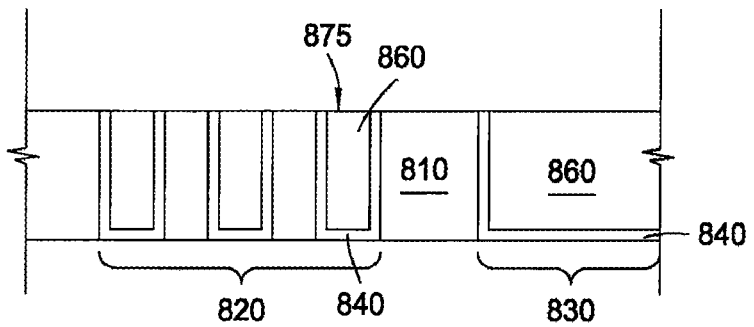

FIGS. 8A-8D are schematic cross-sectional views illustrating a polishing process performed on a substrate according to one embodiment for planarizing a substrate surface described herein. A first Ecmp step may be used to remove bulk tungsten material from the substrate surface as shown from FIGS. 8A-8B and then a second Ecmp step to remove residual tungsten materials as shown from FIGS. 8B-8C. Barrier material removal, and optionally, buffing, are used to remove the remaining barrier material and planarize the surface to form the damascene structure as shown in FIG. 8D. The first Ecmp process produces a fast removal rate of the tungsten layer and the second Ecmp process, due to the precise removal of the remaining tungsten material, forms level substrate surfaces with reduced or minimal dishing and erosion of substrate features. The Ecmp or CMP barrier removal process also forms level substrate surfaces with reduced or minimal dishing and erosion of substrate features.

Figure 1A:
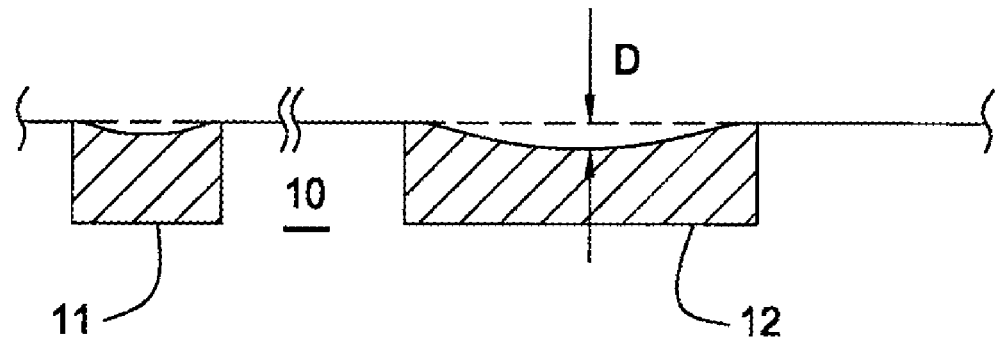
FIGS. 1A and 1B schematically illustrate the phenomenon of dishing and erosion respectively.
Figure 1B:
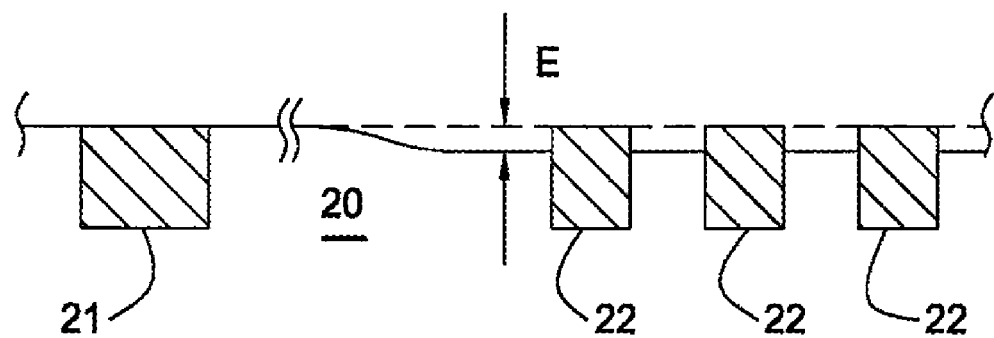

The second Ecmp step is slower in order to prevent excess metal removal from forming topographical defects, such as concavities or depressions known as dishing D, as shown in FIG. 1A, and erosion E as shown in FIG. 1B. Therefore, a majority of the conductive layer 860 is removed at a faster rate during the first Ecmp step than the remaining or residual conductive layer 860 during the second Ecmp step. This Ecmp process increases throughput of the total substrate processing while producing a smooth surface with little or no defects.

Referring to FIG. 8A, the substrate 800 is disposed in a receptacle, such as a basin or platen containing a first electrode. The substrate 800 has a dielectric layer 810 patterned with narrow feature definitions 820 and wide feature definitions 830. The feature definitions, such as vias, trenches, contacts, or holes, are patterned and etched into the dielectric layer 810 by conventional photolithographic and etching techniques. A barrier material, for example, titanium and/or titanium nitride, is deposited as a barrier layer 840 on feature definitions 820, 830 deposited therein. Sufficient conductive material 860, for example, tungsten, is deposited on the substrate surface to fill the feature definitions 820, 830. The deposition profile of the excess material includes a high overburden 870, also referred to as a hill or peak, formed over narrow feature definitions 820 and a minimal overburden 880, also referred to as a valley, over wide feature definitions 830.

The terms narrow and wide feature definitions may vary depending on the structures formed on the substrate surface, but can generally be characterized by the respective deposition profiles of excessive material deposition (or high overburden) formed over narrow feature definitions and minimal or low material deposition (minimal or low overburden), over wide feature definitions. For example narrow feature definitions may be about 0.13 μm in size and may have a high overburden as compared to wide feature definitions that may be about 2 μm in size and that may have minimal or insufficient overburden. However, high overburdens and low overburdens do not necessarily have to form over features, but may form over areas on the substrate surface between features.

The dielectric layer 810 may comprise one or more dielectric materials conventionally employed in the manufacture of semiconductor devices. For example, dielectric materials may include materials such as silicon dioxide, phosphorus-doped silicon glass (PSG), boron-phosphorus-doped silicon glass (BPSG), and silicon dioxide derived from tetraethyl orthosilicate (TEOS) or silane by plasma enhanced chemical vapor deposition (PECVD). The dielectric layer may also comprise low dielectric constant materials, including fluoro-silicon glass (FSG), polymers, such as polyamides, carbon-containing silicon oxides, such as BLACK DIAMOND™ dielectric material, silicon carbide materials, which may be doped with nitrogen and/or oxygen, including BLOK™ dielectric materials, available from Applied Materials, Inc. of Santa Clara, Calif.

A barrier layer 840 is disposed conformally in the feature definitions 820 and 830 and on the substrate 800. The barrier layer 840 may comprise metals or metal nitrides, such as tantalum, tantalum nitride, tantalum silicon nitride, titanium, titanium nitride, titanium silicon nitride, tungsten, tungsten nitride or combinations thereof, or any other material that may limit diffusion of materials between the substrate and/or dielectric materials and any subsequently deposited conductive materials.

A layer of conductive material 860 is disposed on the barrier layer 840. The term "conductive material layer" as used herein is defined as any conductive material, such as tungsten, copper, aluminum, silver or an alloy thereof, used to fill a feature to form lines, contacts or vias. While not shown, a seed layer or wetting layer of a conductive material may be deposited on the barrier layer prior to the deposition of the conductive material 860 to improve interlayer adhesion and improve subsequent deposition processes. The seed layer may be of the same material as the subsequent material to be deposited.

One type of conductive material 860 comprises tungsten containing materials. Tungsten containing materials include tungsten, tungsten alloys (e.g., tungsten-based alloys containing at least about 80 weight percent tungsten) or doped tungsten. As used throughout this disclosure, the phrase "tungsten containing material," the word "tungsten," and the symbol "W" are intended to encompass tungsten, tungsten alloys, doped tungsten, or combinations thereof. Additionally, the conductive material may comprise any conductive material used in semiconductor manufacturing processing.

Although the polishing compositions are particularly useful for removing tungsten, it is believed that the polishing compositions also may be used for the removal of other conductive materials, such as aluminum, platinum, copper, titanium, titanium nitride, tantalum, tantalum nitride, cobalt, gold, silver, ruthenium or combinations thereof. Mechanical abrasion, such as from contact with the conductive polishing article may be used with the polishing composition to improve planarity and improve removal rate of these conductive materials.

In one embodiment of an electrochemical mechanical polishing technique, the substrate is disposed in a receptacle, such as a carrier head and positioned adjacent a platen having polishing article coupled to a polishing article assembly containing a first and second electrode. The substrate is then disposed in the platen and physically contacted with the polishing article and the substrate is electrically coupled with at least one electrode through the polishing article and a polishing composition. The polishing composition is also disposed on the platen between the pad assembly and the substrate. The polishing composition forms a passivation layer on the substrate surface. The passivation layer may chemically and/or electrically insulate material disposed on a substrate surface. Relative motion is provided between the substrate surface and the conductive article to reduce or remove the passivation layer. A bias from a power source is applied between the two electrodes and exposed conductive material may be removed by anodic dissolution.

In general, the application of the bias may be used to dissolve or remove conductive material, such as tungsten-containing materials, formed on a substrate surface by anodic dissolution. The power applied may include a current density up to about 100 milliamps/centimeter squared ($mA/cm^2$) which correlates to an applied current of up to about 40 amps to process substrates with a diameter up to about 300 mm. For example, a 200 mm diameter substrate may have a current density from about 0.01 $mA/cm^2$ to about 50 $mA/cm^2$, which correlates to an applied current from about 0.01 A to about 20 A. The invention also contemplates that the bias may be applied and monitored by volts, amps and watts. In one embodiment, a power supply is used to apply a bias at a power level between about 0.1 Watts and 100 Watts, a voltage between about 0.1 V and about 10 V, and a current between about 0.1 amps and about 20 amps. However, the particular operating specifications of the power supply may vary according to application.

The first, bulk, and second, residual, conductive material removal Ecmp steps may be controlled by the application of power during the respective process. In one embodiment of a bulk and residual removal process, applying biases to the respective steps include applying a DC bias to the bulk removal process and at least a pulse bias during at least a portion of the residual removal process. The DC bias may include a DC voltage, also referred to as a constant voltage bias, and the pulse bias may comprise a time varying voltage bias. In one embodiment, the voltages applied during the residual removal process may be equal to or less than voltages applied during the bulk removal processes. In another embodiment, the voltages applied during the residual removal process may be equal to or greater than voltages applied during the bulk removal processes. Alternatively, the pulse bias of the residual removal process may have maximums and minimums respectively greater than or lesser than the DC voltages applied during the bulk removal process.

Figure 9:
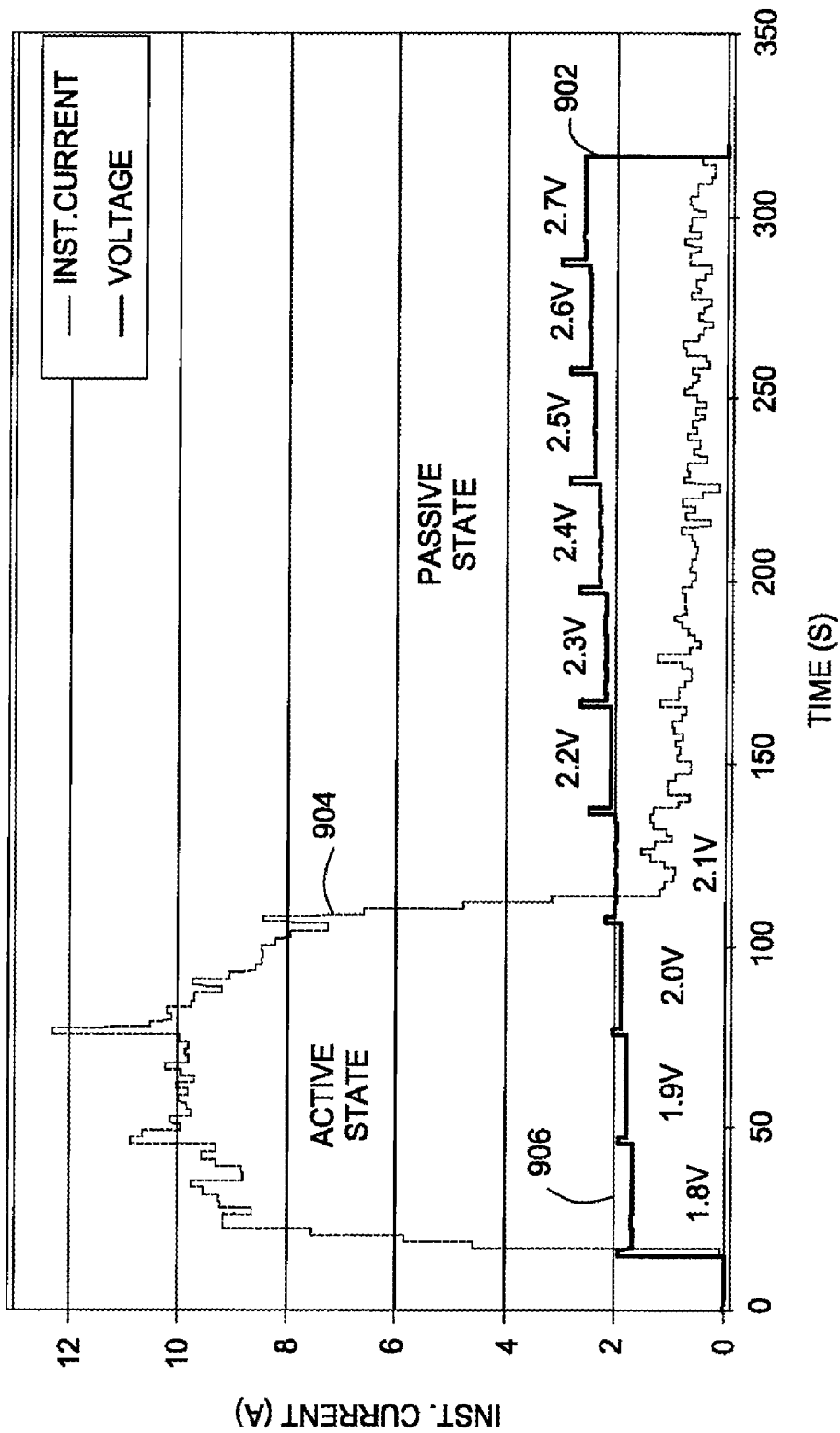
FIG. 9 illustrates current and voltage curves (I & V curve) verse time for an exemplary electrochemical mechanical polishing process.
Figure 10:
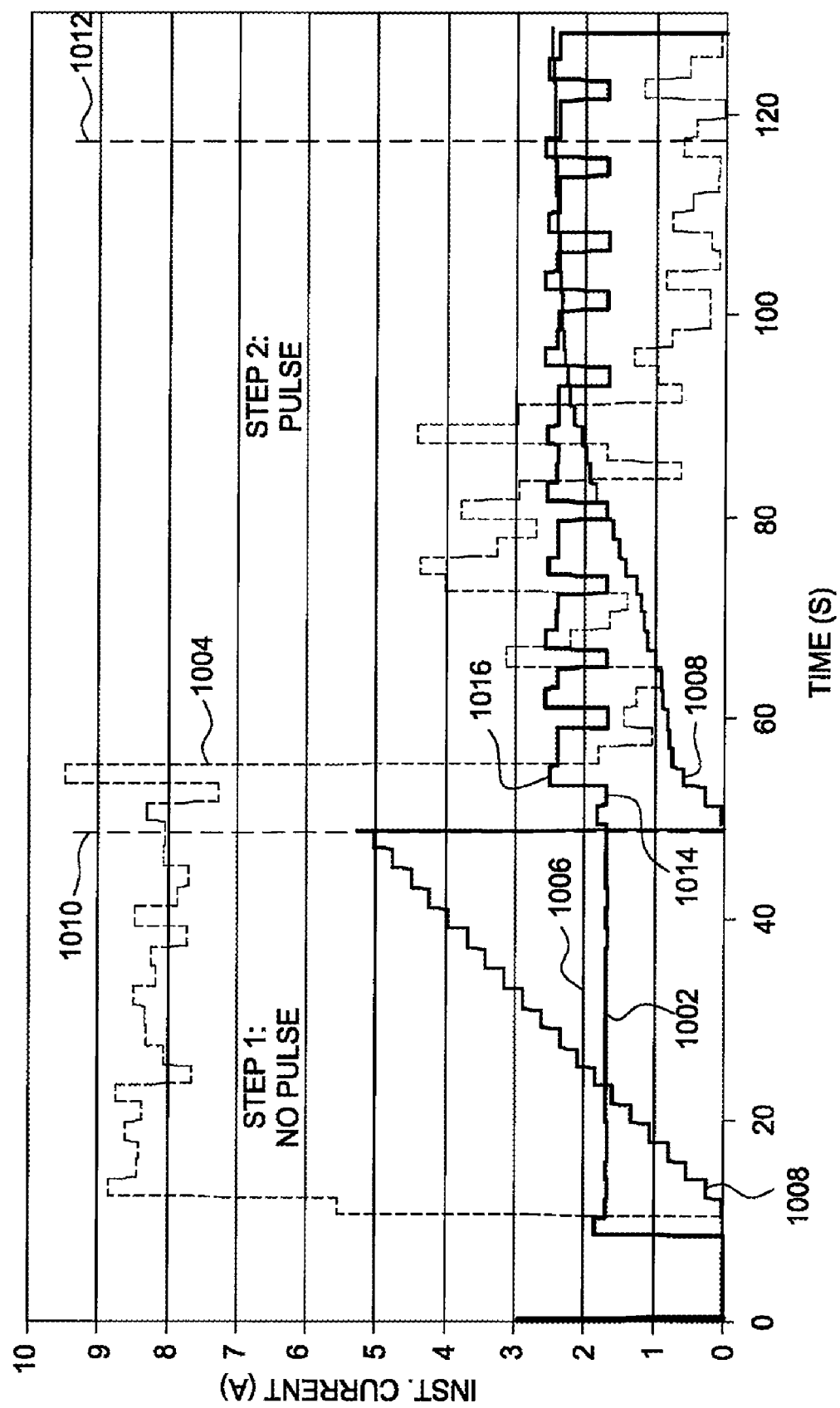
FIG. 10 depicts a graph illustrating current and voltage traces verse time for one embodiment of an exemplary eletroprocessing method.
Figure 11:
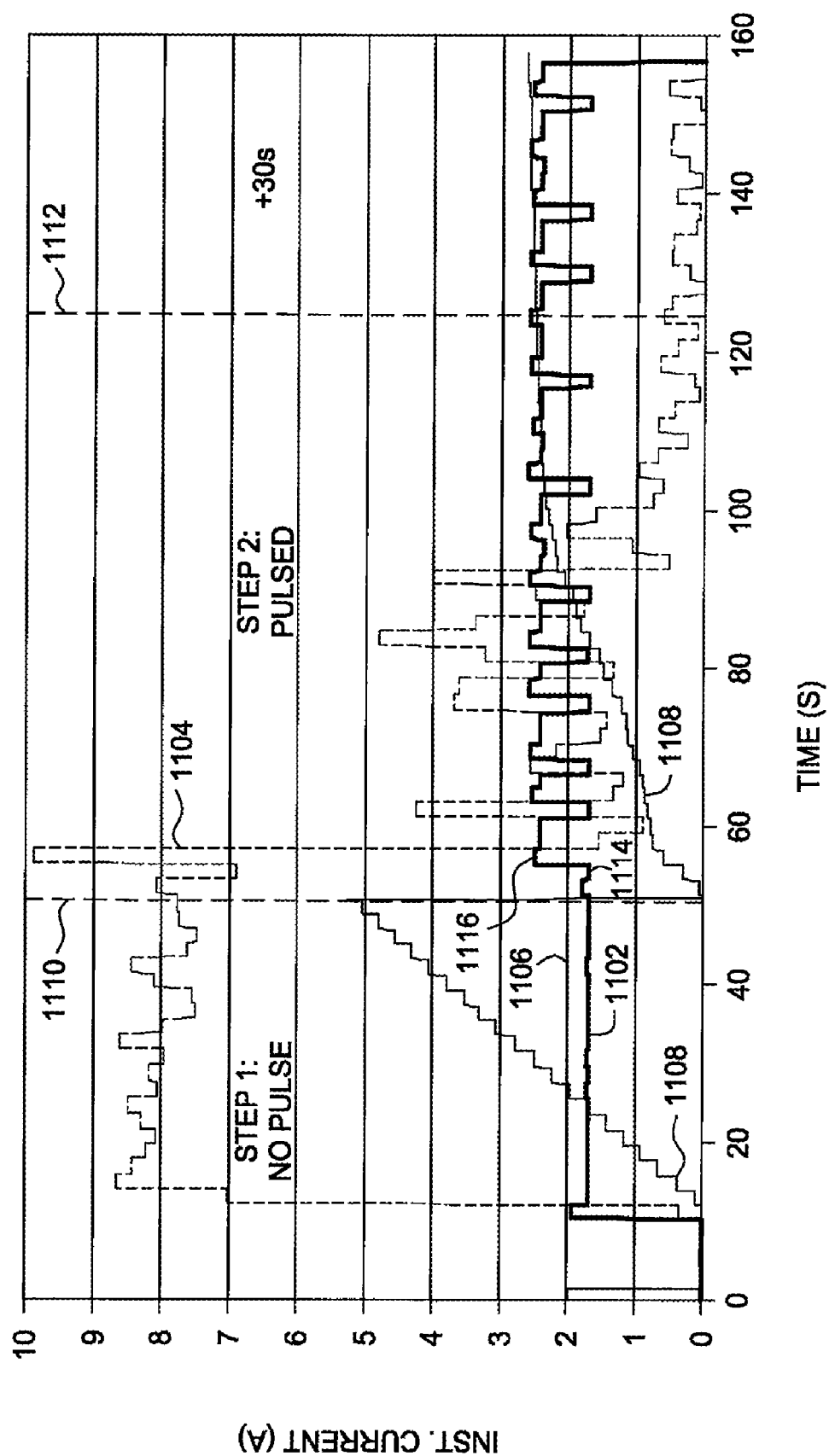
FIG. 11 depicts a graph illustrating current and voltage traces verse time for another embodiment of an exemplary electrochemical mechanical polishing process.
Figure 12:
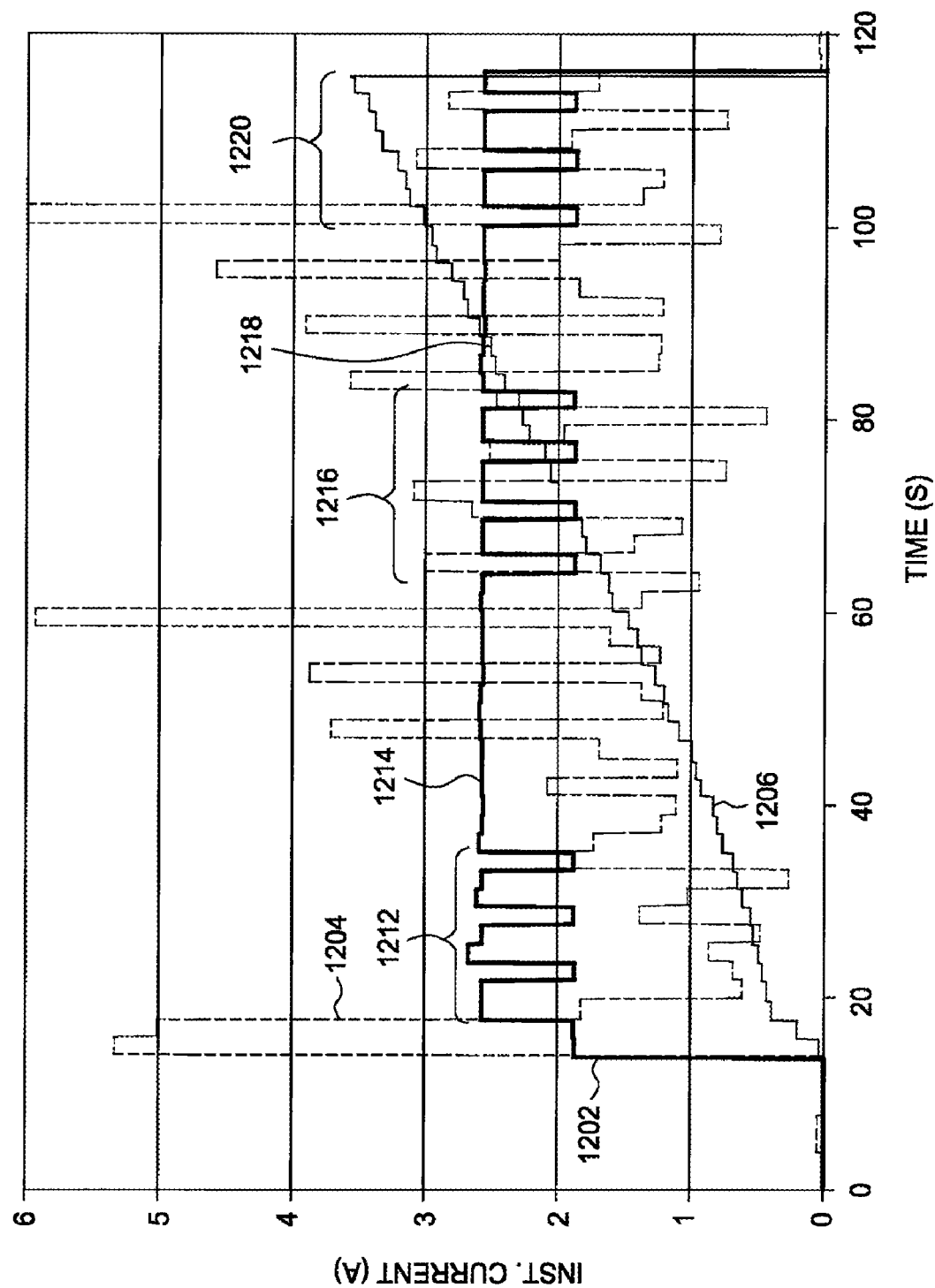
FIG. 12 depicts a graph illustrating current and voltage traces verse time for another embodiment of exemplary electrochemical mechanical polishing process for removing a first portion of conductive material.

While FIGS. 9-12 illustrate a continuous voltage application process that may be performed on a single platen, the invention contemplates that the voltage application may occur on two or more platens, for example, a bulk removal on a first platen and a residual removal on a second platen. Therefore, FIGS. 9-12 are illustrative and should not be construed or interpreted as limiting the scope of the invention. FIG. 9 illustrates a pulse voltage application as described herein. FIG. 10 illustrates voltage application during one embodiment of the first and second Ecmp processes. FIG. 11 illustrates voltage application during another embodiment of the first and second Ecmp processes. FIG. 12 illustrates voltage during one embodiment of the first Ecmp process.

Referring to FIGS. 9 and 10, in one embodiment of the power application process, the voltage application for the first Ecmp process (bulk removal process) includes a direct current (DC) voltage application (one form of the DC bias) of a constant voltage 1002. The DC voltage may be applied between about 0.5 V and about 4.5 V, for example, between about 1.8 V and about 2.7 V. The individual voltage may vary based on the electrical properties of the polishing composition.

The DC voltage may include a critical voltage and voltages on either side of the critical voltage. The critical voltage is located between the active corrosion state voltage and the passive corrosion state voltage. At the active corrosion state voltage, the metal layer oxidizes into metal ions (corrodes) and removes material from the substrate surface and includes the voltage less than the critical voltage. At the passive state voltage, the metal layer forms a metal oxide layer, which may add to or form a passivation layer, and removal of material from the substrate surface is minimal. The passive state voltage generally includes voltage which is greater than the critical voltage. The critical voltage represents the upper voltage limit for the active state and the lower voltage limit for the passive state. The critical voltage may vary in each process, and is generally proportional to the pH of the electrolyte chemistry, and, the critical voltage will either rise or fall proportionally with the pH. For example, if the pH of the polishing composition is higher, the critical voltage will increase proportionally. In the following figures and according to the example composition described herein, the electrolyte chemistry pH is 6.85.

The DC voltage of the bulk removal process may be applied in a step-wise fashion. For example, a first constant voltage may be applied for a first period of time $t_1$ followed by a step-wise decrease in the DC voltage to a second constant voltage less than the first constant voltage for a second period of time $t_2$ before ending the bulk removal process and/or beginning the residual removal process. Alternatively, the second DC voltage may be greater then the first DC voltage. In another embodiment, a third DC voltage may then be applied that is less than, equal to, or greater than the first or second DC voltage. In one embodiment, the DC voltage applications may be either in the active corrosion state voltage range only or the passive corrosion state voltage range only. In another embodiment the applied voltage in the step-wise embodiments may be in both the active corrosion state voltage range and the passive corrosion state voltage range.

Alternatively, the bias application for the first Ecmp process step for bulk removal may include a pulse bias application technique in substitution of or in addition to the DC voltage application. FIG. 12 illustrates a first Ecmp process having both a constant voltage and a pulse voltage applied during the process.

Pulse modulation techniques may vary, but generally include a cycle of applying a voltage for a first time period, then applying no voltage, a reverse voltage (e.g., a negative polarity for a positive polarity first voltage), or second voltage different than the first voltage for a second time period. The process may then be repeated for one or more cycles, which may have varying power levels and durations. The pulse voltage may be applied between about 0.1 V and about 3 V. The individual pulse voltage difference may vary, for example, the pulse may vary between 0.001 volts and about 3 volts between the respective maximum and minimum voltages of the pulse. Each minimum and maximum voltage application of the pulse may have a duration of between about 0.01 second and about 20 seconds. The bias of the pulse may also include the active state corrosion voltage, the passive state corrosion voltage, or both. The pulse voltage may further include waveforms, such as sinusoidal and sawtooth waveforms as are known in the art. The pulse voltage may vary based on the electrical properties of the polishing composition.

The bias may be varied in power and application depending upon the user requirements in removing material from the substrate surface. For example, increasing power application has been observed to result in increasing anodic dissolution. The pulse voltage application may further include a step increase or decrease in voltage in one or more of the one or more cycles of the process. For example, referring to FIG. 1, pulse voltage increases step wise for 0.1 volts per each cycle. The step increase may occur between 0.01 volt and 1 volt.

In one embodiment of the pulse modulation process for electrochemical mechanical polishing, the pulse modulation process comprises an on/off power technique with a period of power application, "on", followed by a period of no power application, "off". The on/off cycle may be repeated one or more times during the polishing process. The "on" periods allow for removal of exposed conductive material from the substrate surface and the "off" periods allow for polishing composition components and by-products of "on" periods, such as metal ions, to diffuse to the surface and complex with the conductive material. During a pulse modulation technique process it is believed that the metal ions migrate and interact with the corrosion inhibitors and/or chelating agents by attaching to the passivation layer in the non-mechanically disturbed areas. The process thus allows etching in the electrochemically active regions, not covered by the passivation layer, during an "on" application, and then allowing reformation of the passivation layer in some regions and removal of excess material during an "off" portion of the pulse modulation technique in other regions. Thus, control of the pulse modulation technique can control the removal rate and amount of material removed from the substrate surface. In one example of a pulse modulation technique, anodic dissolution power is applied between about 16% and about 66% of each cycle.

In another embodiment of the pulse modulation techniques, a positive polarity pulse application process may be performed having the first and second voltages both above 0 volts. FIG. 9 illustrates current and voltage curves (I & V curve) verse time for an exemplary electrochemical mechanical polishing process. Line 902 represents voltage, line 904 represents the measured current for a particular voltage, and line 906 represents the critical voltage which is approximately between about 2.0 V and about 2.1 V for the particular composition and hardware used in this example. The low voltage, below line 906, corresponds to the active corrosion state and the high voltage, above line 906 corresponds to the passive corrosion state of tungsten in this current electrolyte chemistry. The critical voltage 906 is located between the active state and the passive state.

Below the critical voltage 906 the metal layer corrodes rapidly and thus is rapidly removed in what is called in active state. Above the critical voltage 906 is the passive state where a passivation layer forms and corrosion is minimal. Thus the critical voltage represents the upper voltage limit for the active state and the lower voltage limit for the passive state. In FIG. 9, when the voltage 902 is below the critical voltage 906, the electrochemical processing is in an active state. When the voltage 902 is above the critical voltage represented by line 906, the electrochemical processing occurs in a passive state.

The pulses are provided at first voltage of about 1.8 and about 2.7 volts with a second voltage about 0.3 volts higher than the first voltage for each pulse. In such a pulse configuration, the second voltage may be between 0.1 volts and about 1 volt. The second voltage is generally greater than any step increase in the first voltage between cycles. Each cycle of the pulse application in FIG. 9 illustrates a step increase in voltage of approximately 0.1 volts per cycle. The first voltage may be applied between about 20 and about 22 seconds, for example, 21 seconds, and the second voltage applied between about 3 and about 6 seconds, for example about 4 seconds.

FIG. 10 depicts a graph illustrating current and voltage traces verse time for one embodiment of an exemplary eletroprocessing method. Line 1002 represents voltage, line 1004 represents the measured current for a particular voltage, line 1006 represents the critical voltage, line 1008 represents the total accumulated charge, dashed line 1010 represents a first endpoint, and dashed line 1012 represents a second endpoint. The process before the first endpoint 1010 is the first Ecmp polishing step, the bulk removal step as descried herein, and the process between the first endpoint 1010 and the second endpoint 1012 is the second Ecmp process, the residual removal process. After the second endpoint 1012 is reached, a timed overpolish occurs.

The first endpoint 1010 and the second endpoint 1012 represent known thicknesses of the wafer. In this example, the endpoints were determined using the total accumulated charge method. The endpoints are pre-determined by a pre-measurement of incoming wafer thickness and a software algorithm. The software algorithm determines how much charge is removed from each spot on the wafer surface and the charge is correlated to the wafer thickness. The charge is proportional to the total amount of material removed from the wafer. Since the area of the wafer is known, the accumulated charge is in turn proportional to the thickness of the material removed. Endpoint detection methods are discussed in U.S. patent application Publication No. 2005/0061674 entitled "Endpoint Compensation In Electroprocessing," published Mar. 24, 2005, which is incorporated by reference herein to the extent not inconsistent with the claimed aspects and disclosure herein. Other endpoint detection methods known in the art can also be used including eddy currents and interferometers.

The first endpoint 1010 represents the end of the first, bulk polish step described below with reference to FIG. 8A. Prior to endpoint 1010, continuous voltage 1002 is applied during the bulk removal step, for example at a voltage of about 1.8 volts. Alternatively, and not shown, the voltage 1002 may be a pulse process as described herein. Prior to the first endpoint 1010, the voltage 1002 is less than the critical voltage 1006, and the bulk removal step occurs in the active state. When the first endpoint 1010 is reached, the bulk polish step ends and the residual polishing step begins.

In the residual polish step, occurring to the right of the first endpoint 1010, the voltage 1002 begins with a low voltage pulse 1014 which is below the critical voltage 1006 and thus occurring in the active state as shown in FIG. 10. The voltage 1002 moves above the critical voltage 1006 into the passive state with a high voltage pulse 1016 as time proceeds. Thus, the pulsing occurs on either side of the critical voltage 1006. Each pulse lasts for a time period of approximately 4 seconds (time period can be varied depending on the film thickness and electrochemical properties). Also, the time period for each voltage does not have to be the same. These alternating high and low voltage pulses continue for several cycles. The low voltage is approximately in a range between about 1.0 V and about 2.0 V, for example about 1.8 V. The high voltage is approximately in a range between about 2.0 V and about 3.5 V, for example about 2.5 V. Line 1006 demonstrates that the pulses are primarily above the critical voltage 1006 for the time period between first endpoint 1010 and second endpoint 1012. Thus this residual polish step occurs primarily in the passive state but in order to keep removing conductive material the voltage 1002 moves down into the active state for short time periods. This residual clearance stage will generally have a 20-50% duty cycle of low to high voltage.

FIG. 11 depicts a graph illustrating current and voltage traces verse time for another embodiment of an exemplary electrochemical mechanical processing method. Line 1102 represents voltage, line 1104 represents the measured current for a particular voltage, line 1106 represents the critical voltage, line 1108 represents the total accumulated charge, dashed line 1110 represents a first endpoint, and dashed line 1112 represents a second endpoint.

In the residual polish step, occurring to the right of the first endpoint 1110, the voltage 1102 begins with a low voltage pulse 1114 which is below the critical voltage 1106 and thus occurring in the active state. The voltage 1102 moves above the critical voltage 1106 into the passive state with a high voltage pulse 1116 as time proceeds. Thus the pulsing occurs on either side of the critical voltage 1106. Furthermore, the pulse ratios can be varied. These alternating high and low voltage pulses continue for several cycles. The low voltage is approximately in a range between about 1.0 V and about 2.0 V, for example about 1.8 V. The high voltage is approximately in a range between about 2.0 V and about 3.5 V, for example about 2.5 V. Line 1106 demonstrates that the pulses are primarily above the critical voltage 1106 for the time period between first endpoint 1110 and second endpoint 1112. Thus this residual polish step occurs primarily in the passive state but in order to keep removing material the voltage 1102 moves down into the active state for short time periods. This residual clearance stage will generally have a 20-50% duty cycle of low to high voltage. After the second endpoint 1112 is reached, a timed overpolish occurs. In FIG. 11, the overpolish occurs for an additional thirty seconds.

In one example of the electrochemical polishing process, a constant voltage 1102 of about 1.8 volts is provided to the first endpoint and a pulse voltage 1116 is applied for a repeating cycle at a first voltage of 1.8 volts for 6.5 seconds and a second voltage of 2.5 volts for 6.5 seconds.

FIG. 12 depicts a graph illustrating current and voltage traces verse time for another embodiment of exemplary electrochemical mechanical polishing process for removing a first portion of the conductive material. The FIG. 12 illustrates one embodiment of a power application process for a first Ecmp processing step having both constant voltage and pulse voltage as described herein. The constant and pulse voltage may be in any number of combination or durations, and the following examples illustrates 3 pulse voltages and two constant voltages. The process shown in FIG. 12 may also be used in removing residual material in a second Ecmp polishing process. In FIG. 12, line 1202 represents voltage, line 1204 represents the measured current for a particular voltage, line 1206 represents the total accumulated charge.

During the first Ecmp process step, the bulk removal step, the voltage 1202 begins with a first pulse voltage 1212, which has a first voltage of 1.8 volts and a second voltage of 2.7 volts for about 3 cycles of 5 seconds each. The voltage 1202 becomes a first constant voltage 1214 of about 2.7 volts for about 30 second followed by a second pulse voltage 1216 with the same parameters as the first pulse voltage 1212, followed by a second constant voltage 1218 with the same parameters as the first constant voltage 1214 with a time duration of about 25 seconds, and the voltage 1202 is concluded with a third pulse voltage 1220 with the same parameters as the first pulse voltage 1212.

Other embodiments of the invention contemplate adjusting the duty cycle between high and low voltage to increase the ratio of high voltage to low voltage as the residual polish endpoint is approached. This increases the ratio of passive state to active state thus slowing the residual polishing rate as the endpoint is approached.

In another embodiment, a second critical voltage is used. This second critical voltage occurs at a high voltage. Above this second critical voltage is another active state and below the second critical voltage is the passive state. This second critical voltage can be used similarly to the first critical voltage discussed above.

Referring back to FIGS. 8A-8B, the Ecmp process begins by positioning the substrate in a polishing apparatus and exposing the substrate 800 to a polishing composition 855 that can form a passivation layer 890 on the conductive material layer 860. The passivation layer 890 may be formed by the polishing compositions described herein.

The substrate is exposed to a polishing composition described herein that forms a passivation layer 890 on the conductive material 860. The passivation layer 890 forms on the exposed conductive material 860 on the substrate surface including the high overburden 870, peaks, and minimal overburden 880, valleys, formed in the deposited conductive material 860. The passivation layer 890 chemically and/or electrically insulates the surface of the substrate from chemical and/or electrical reactions. The passivation layer is formed from the exposure of the substrate surface to the corrosion inhibitor and/or other materials capable of forming a passivating or insulating film, for example, chelating agents. The thickness and density of the passivation layer can dictate the extent of chemical reactions and/or amount of anodic dissolution. For example, a thicker or denser passivation layer has been observed to result in less anodic dissolution compared to thinner and less dense passivation layers. Thus, control of the composition of passivating agents, corrosion inhibitors and/or chelating agents, allow control of the removal rate and amount of material removed from the substrate surface.

A polishing composition as described herein for bulk tungsten removal is provided to the substrate surface. The polishing composition may be provided at a flow rate between about 100 and about 400 milliliters per minute, such as about 300 milliliters per minute, to the substrate surface. An example of the polishing composition for the bulk removal step includes between about 1 vol % and about 5 vol % of phosphoric acid, between about 1 wt % and about 5 wt % of citric acid, between about 1 ppm and about 100 ppm of polyethyleneimine; between about 0.1 vol % and about 1 vol % of aniline, between about 5 vol % and 15 vol % of potassium hydroxide to provide a pH between about 3 and about 8 (approximately 6.80 in this example), and deionized water.

A polishing article coupled to a polishing article assembly containing a second electrode is then physically contacted and/or electrically coupled with the substrate through a conductive polishing article. The substrate surface and polishing article are contacted at a pressure less than about 2 pounds per square inch (lb/in$^2$ or psi) (13.8 kPa). Removal of the conductive material 860 may be performed with a process having a pressure of about 1 psi (6.9 kPa) or less, for example, from about 0.01 psi (69 Pa) to about 1 psi (6.9 kPa), such as between about 0.1 (0.7 kPa) psi and about 0.8 psi (5.5 kPa) or between about 0.1 (0.7 kPa) psi and less than about 0.5 psi (3.4 kPa). In one aspect of the process, a pressure of about 0.3 psi (2.1 kPa) is used. The process may also be performed at a temperature between about 20° C. and about 60° C.

The polishing pressures used herein reduce or minimize damaging shear forces and frictional forces for substrates containing low k dielectric materials. Reduced or minimized forces can result in reduced or minimal deformations and defect formation of features from polishing. Further, the lower shear forces and frictional forces have been observed to reduce or minimize formation of topographical defects, such as erosion of dielectric materials and dishing of conductive materials as well as reducing delamination, during polishing. Contact between the substrate and a conductive polishing article also allows for electrical contact between the power source and the substrate by coupling the power source to the polishing article when contacting the substrate.

Relative motion is provided between the substrate surface and the conductive pad assembly 222. The conductive pad assembly 222 disposed on the platen is rotated at a platen rotational rate of between about 7 rpm and about 50 rpm, for example, about 28 rpm, and the substrate disposed in a carrier head is rotated at a carrier head rotational rate between about 7 rpm and about 70 rpm, for example, about 37 rpm. The respective rotational rates of the platen and carrier head are believed to provide reduced shear forces and frictional forces when contacting the polishing article and substrate. Both the carrier head rotational speed and the platen rotational speed may be between about 7 rpm and less than 40 rpm. In one aspect of the invention, the processes herein may be performed with carrier head rotational speed greater than a platen rotational speed by a ratio of carrier head rotational speed to platen rotational speed of greater than about 1:1, such as a ratio of carrier head rotational speed to platen rotational speed between about 1.5:1 and about 12:1, for example between about 1.5:1 and about 3:1, to remove the conductive material 860. The physical contact and relative motion between the substrate and the polishing article may additionally remove a portion of the conductive material 860.

A bias from a power source 224 is applied between the two electrodes. The bias may be transferred from a conductive pad and/or electrode in the polishing article assembly 222 to the substrate 122. The bias may be applied for the first Ecmp process as described above in reference to FIGS. 9-11.

A removal rate of conductive material of up to about 15,000 Å/min can be achieved by the processes described herein. Higher removal rates are generally desirable, but due to the goal of maximizing process uniformity and other process variables (e.g., reaction kinetics at the anode and cathode) it is common for dissolution rates to be controlled from about 100 Å/min to about 15,000 Å/min. In one embodiment of the invention where the bulk tungsten material to be removed is less than 5,000 Å thick, the voltage (or current) may be applied to provide a removal rate from about 100 Å/min to about 5,000 Å/min, such as between about 2,000 Å/min to about 5,000 Å/min. The residual material is removed at a rate lower than the bulk removal rate and by the processes described herein may be removed at a rate between about 400 Å/min to about 1,500 Å/min.

FIGS. 8B-8C illustrate the second Ecmp polishing step after at least about 50% of the conductive material 860 was removed after the bulk removal of the first Ecmp step, for example, about 90%. After the first Ecmp step, conductive material 860 may still include the high overburden 870, peaks, and/or minimal overburden 880, valleys, but with a reduced proportionally size. However, conductive material 860 may also be rather planar across the substrate surface (not pictured).

The second Ecmp step may be performed to remove the remaining conductive material, the residual material. In the second Ecmp polishing process, a second polishing composition as described herein for residual conductive material removal is provided to the substrate surface. In this embodiment, the same polishing composition is used for the bulk removal step and the residual removal step. However, in other embodiments, the first and second polishing composition may differ. The residual polishing composition may be provided at a flow rate between about 100 and about 400 milliliters per minute, such as about 300 milliliters per minute. An example of the polishing composition for the residual removal step includes between about 1 vol % and about 5 vol % of phosphoric acid, between about 1 wt % and about 5 wt % of citric acid, between about 1 ppm and about 100 ppm of polyethyleneimine; between about 0.1 vol % and about 1 vol % of aniline, between about 5 vol % and 15 vol % of potassium hydroxide to provide a pH between about 3 and about 8 (approximately 6.80), and deionized water.

The residual polishing composition described herein is believed to form a reaction layer, either a tungsten oxide layer or a polytungstate layer 895 on the surface of the exposed tungsten material. This layer is formed by the electrochemical etching of the tungsten material. The tungsten oxide layer or the polytungstate layer is more inert in this electrolyte than the tungsten material and is removed at a lower rate than the tungsten material. The tungsten oxide layer may also chemically and/or electrically insulate material disposed on a substrate surface. It was found that a form of tungsten oxide (e.g. $H_2WO_4$) can exist up to a pH of 10.5.

The thickness and density of the polytungstate layer can dictate the extent of chemical reactions and/or amount of anodic dissolution. For example, a thicker or denser polytungstate layer has been observed to result in less anodic dissolution compared to thinner and less dense passivation layers. Thus, control of the composition of pH of the composition, phosphoric acid, and/or chelating agents, allow control of the removal rate and amount of material removed from the substrate surface. The resulting reduced removal rate as compared to the bulk polishing composition reduces or minimizes formation of topographical defects, such as erosion of dielectric materials and dishing of conductive materials. A reduced down force pressure from conventional polishing pressures of 2 psi or more also result in reduced delamination during polishing.

The mechanical abrasion in the above residual removal step are performed at a contact pressure less than about 2 pounds per square inch ($lb/in^2$ or psi) (13.8 kPa) between the polishing pad and the substrate. Removal of the conductive material 860 may be performed with a process having a pressure of about 1 psi (6.9 kPa) or less, for example, from about 0.01 psi (69 Pa) to about 1 psi (6.9 kPa), such as between about 0.1 (0.7 kPa) psi and about 0.8 psi (5.5 kPa). In one aspect of the process, a pressure of about 0.3 psi (2.1 kPa) or less is used. Contact between the substrate and a conductive polishing article also allows for electrical contact between the power source and the substrate by coupling the power source to the polishing article when contacting the substrate.

Relative motion is provided between the substrate surface and the conductive pad assembly 222. The conductive pad assembly 222 disposed on the platen is rotated at a rotational rate of between about 7 rpm and about 50 rpm, for example, about 28 rpm, and the substrate disposed in a carrier head is rotated at a rotational rate between about 7 rpm and about 70 rpm, for example, about 37 rpm. The respective rotational rates of the platen and carrier head are believed to provide reduce shear forces and frictional forces when contacting the polishing article and substrate.

Mechanical abrasion by a conductive polishing article removes the polytungstate/tungsten oxide layer 895 that insulates or suppresses the current for anodic dissolution, such that areas of high overburden are preferentially removed over areas of minimal overburden as the polytungstate layer 895 is retained in areas of minimal or no contact with the conductive pad assembly 222. The removal rate of the conductive material 860 covered by the polytungstate layer 895 is less than the removal rate of conductive material without the polytungstate layer 895. As such, the excess material disposed over narrow feature definitions 820 and the substrate field 850 is removed at a higher rate than over wide feature definitions 830 still covered by the polytungstate layer 895.

A bias from a power source 224 is applied between the two electrodes. The bias may be transferred from a conductive pad and/or electrode in the polishing article assembly 222 to the substrate 122. The bias is as described above, for example, as shown in FIGS. 10 and 11. The substrate is typically exposed to the polishing composition and power application for a period of time sufficient to remove at least a portion or all of the desired material disposed thereon. The step may also be performed at a temperature between about 20° C. and about 60° C.

Referring to FIGS. 8C-8D, most, if not all of the conductive layer 860 is removed to expose barrier layer 840 and conductive trenches 865 by polishing the substrate with a second, residual, Ecmp process including the second Ecmp polishing composition described herein. The conductive trenches 865 are formed by the remaining conductive material 860. The barrier material may then be selectively polished by a third polishing step to provide a planarized substrate surface containing conductive trenches 875, as depicted in FIG. 8D. The barrier polishing composition provides for selective removal of barrier material to tungsten and oxide at a barrier removal rate to tungsten removal rate at between about 30:1 and about 80:1, such as about 60:1, and a barrier removal rate to dielectric removal rate of between about 3:1 and about 6:1, such as about 4:1.

The barrier polishing process may be a chemical mechanical polishing process or an electro chemical mechanical polishing process, or a multi-step process of both. The barrier removal process and barrier polishing chemistries are discussed in greater detail in co-pending patent application Ser. No. 11/130,032 entitled "Method and Composition For Polishing A Substrate," filed May 16, 2005, which is herein incorporated by reference top the extent not inconsistent with the claimed aspects and disclosure herein.

The barrier removal process using chemical mechanical polishing (CMP) includes providing a CMP composition at a flow rate between about 100 and about 500 milliliters per minute, such as between about 200 milliliters and about 300 milliliters per minute, for example, about 150 milliliters to the substrate surface. An example of the CMP composition for the barrier removal step includes between about 1 wt. % and about 10 wt. % of an oxidizer, between about 0.5 wt. % and about 5 wt. % of a chelating agent, between about 0.0001 wt % and about 1 wt % of a polymeric stabilizer, between about 0.3 wt % and about 10 wt % of abrasive particles, a pH between about 1 and about 6, and a solvent. A further example of a polishing composition includes about 3 wt. % of hydrogen peroxide, about 1 wt. % of ammonium citrate, about 0.1 wt. % of polyacrylic acid, about 4 wt % of alumina particles, a pH between about 4 and about 5, and a solvent.

Alternatively, the barrier removal composition may be used in an electrochemical mechanical polishing (Ecmp) process as described for tungsten removal herein with the power application being within the within the range of power application in the tungsten electrochemical mechanical polishing process. The barrier removal process using electrochemical mechanical polishing includes providing an Ecmp barrier composition at a flow rate between about 10 and about 500 milliliters per minute with the Ecmp barrier composition including about 2% by volume phosphoric acid, about 2% by weight ammonium citrate, about 0.3% by weight benzotriazole, about 0.01% by weight $(NH_4)_2SiF_6$, between about 1% and about 3% by volume of potassium hydroxide to provide a pH of about 3 and deionized water.

A polishing article is then physically contacted and/or electrically coupled with the substrate through a polishing article. The substrate surface and polishing article are contacted at a pressure of between about 0.5 psi (3.4 kPa) and about 5 psi (34 kPa), such as about 2 pounds per square inch ($lb/in^2$ or psi) (13.8 kPa). Relative motion is provided between the substrate surface and the conductive pad assembly 222. The conductive pad assembly 222 disposed on the platen is rotated at a platen rotational rate of between about 50 rpm and about 100 rpm, for example, about 80 rpm, and the substrate disposed in a carrier head is rotated at a carrier head rotational rate between about 10 rpm and about 200 rpm, for example, about 80 rpm. Alternatively, for the electrochemical mechanical polishing process, a conductive polishing article coupled to a second electrode is contacted with the substrate and a power application between about 0.01 milliamps/$cm^2$ and about 20 milliamps/$cm^2$ is applied between the substrate and the electrode.

After conductive material and barrier material removal processing steps, the substrate may then be buffed to minimize surface defects. Buffing may be performed with a soft polishing article, i.e., a hardness of about 40 or less on the Shore D hardness scale as described and measured by the American Society for Testing and Materials (ASTM), headquartered in Philadelphia, Pa., at reduced polishing pressures, such as about 2 psi or less.

Optionally, a cleaning composition may be applied to the substrate after each of the polishing processes to remove particulate matter and spent reagents from the polishing process as well as help minimize metal residue deposition on the polishing articles and defects formed on a substrate surface. An example of a suitable cleaning composition is ELECTRA CLEAN™, commercially available from Applied Materials, Inc., of Santa Clara, Calif.

Finally, the substrate may be exposed to a post polishing cleaning process to reduce defects formed during polishing or substrate handling. Such processes can minimize undesired oxidation or other defects in tungsten features formed on a substrate surface. An example of such a post polishing cleaning is the application of ELECTRA CLEAN™, commercially available from Applied Materials, Inc., of Santa Clara, Calif.

It has been observed that substrate planarized by the processes described herein have exhibited reduced topographical defects, such as dishing and erosion, reduced residues, improved planarity, and improved substrate finish.

Polishing Composition

In one aspect, polishing compositions that can planarize metals, such as tungsten, are provided. Generally, the polishing composition includes an acid based electrolyte, a first chelating agent having a carboxylate function group, a passivating polymeric material, a second chelating agent having an amine function group, an amide function group, or combinations thereof, a pH adjusting agent to provide a pH between about 3 and about 8, and a solvent. Embodiments of the polishing composition may be used for polishing bulk and/or residual materials. The polishing composition may optionally include one or more corrosion inhibitors or a polishing enhancing material, such as abrasive particles. While the compositions described herein are oxidizer free compositions, the invention contemplates the use of oxidizers as a polishing enhancing material that may further be used with an abrasive material. It is believed that the polishing compositions described herein improve the effective removal rate of materials, such as tungsten, from the substrate surface during Ecmp, with a reduction in planarization type defects and yielding a smoother substrate surface. The embodiments of the compositions may be used in a one-step or two-step polishing process.

Although the polishing compositions are particularly useful for removing tungsten. It is believed that the polishing compositions may also remove other conductive materials, such as aluminum, platinum, copper, titanium, titanium nitride, tantalum, tantalum nitride, cobalt, gold, silver, ruthenium and combinations thereof. Mechanical abrasion, such as from contact with the conductive pad and/or abrasives, and/or anodic dissolution from an applied electrical bias, may be used to improve planarity and improve removal rate of these conductive materials.

The acid based electrolyte system may include a phosphoric acid based electrolyte systems, for example, electrolytes and compounds having a phosphate group ($PO_4^{3-}$), such as, phosphoric acid, and/or derivative salts thereof including, for example, phosphate ($M_xH_{(3-x)}PO_4$) (x=1, 2, 3), with M including ammonium ($NH_4^+$), sodium ($Na^+$), tetramethyl ammonium ($Me_4N^+$) or potassium ($K^+$) salts, tungsten phosphate, ammonium dihydrogen phosphate (($NH_4$)$H_2PO_4$), diammonium hydrogen phosphate (($NH_4$)$_2HPO_4$), and combinations thereof, of which phosphoric acid is preferred.

Alternatively, other acid based acidic systems may be used in combination or in substitution with the phosphoric acid based system. One example of a system that may be used in combination or substitution is a sulfuric acid based electrolyte system includes, for example, electrolytes and compounds having a sulfate group ($SO_4^{2-}$), such as sulfuric acid ($H_2SO_4$), and/or derivative salts thereof including, for example, ammonium hydrogen sulfate ($NH_4HSO_4$), ammonium sulfate, potassium sulfate, tungsten sulfate, or combinations thereof, of which sulfuric acid is preferred. Derivative salts may include ammonium ($NH_4^+$), sodium ($Na^+$), tetramethyl ammonium ($Me_4N^+$, potassium ($K^+$) salts, or combinations thereof, among others. Other acid based electrolytes include an acetic acid based electrolytic, including acetic acid and/or derivative salts, or a salicylic acid based electrolyte, including salicylic acid and/or derivative salts, may be used in place of the phosphoric acid based electrolyte system. The acid based electrolyte systems described herein may also buffer the composition to maintain a desired pH level for processing a substrate. The invention also contemplates that conventional electrolytes known and unknown may also be used in forming the composition described herein using the processes described herein.

The acid based electrolyte system may include between about 0.1 and about 30 percent by weight (wt %) or volume (vol %) of the total composition of solution to provide suitable conductivity for practicing the processes described herein. Acid electrolyte concentrations between about 1 vol % and about 8 vol %, for example 3 vol %, may be used in the composition. The acid based electrolyte may also be added in solution, for example, the 3 wt. % of phosphoric acid may be from 85% aqueous phosphoric acid solution for an actual phosphoric acid composition of about 2.6 wt. %.

One aspect or component of the present invention is the use of one or more chelating agents to complex with the surface of the substrate to enhance the electrochemical dissolution process. In any of the embodiments described herein, the chelating agents can bind to ions of a conductive material, such as tungsten ions, increase the removal rate of metal materials and/or improve polishing performance. The chelating agents may also be used to buffer the polishing composition to maintain a desired pH level for processing a substrate.

One suitable category of chelating agents includes organic acids and salts thereof. Suitable organic acids, and salts thereof, may include compounds having one or more functional groups selected from the group of carboxylate groups, dicarboxylate groups, tricarboxylate groups, a mixture of hydroxyl and carboxylate groups, and combinations thereof. The metal materials for removal, such as tungsten, may be in any oxidation state before, during or after ligating with a functional group. The functional groups can bind the metal materials created on the substrate surface during processing and remove the metal materials from the substrate surface. The polishing composition may include one or more organic acids and salts thereof at a concentration between about 0.1% and about 15% by volume or weight of the composition, such as between about 1% and about 5% by volume or weight, for example about 1% by volume or weight.

Examples of suitable acids for use in the composition or use in forming the salts that having one or more carboxylate groups include citric acid, tartaric acid, succinic acid, oxalic acid, acetic acid, adipic acid, butyric acid, capric acid, caproic acid, caprylic acid, glutaric acid, glycolic acid, formaic acid, fumaric acid, lactic acid, lauric acid, malic acid, maleic acid, malonic acid, myristic acid, plamitic acid, phthalic acid, propionic acid, pyruvic acid, stearic acid, valeric acid, and combinations thereof. Examples of suitable organic acid salts include ammonium and potassium salts of organic acids, such as ammonium oxalate, ammonium citrate, ammonium succinate, monobasic potassium citrate, dibasic potassium citrate, tribasic potassium citrate, potassium tartarate, ammonium tartarate, potassium succinate, potassium oxalate, and combinations thereof.

While the acid and salts of a compound including a carboxylate functional group may be free of hydroxyl group or an amine group, the invention contemplates the acids and salts of a compound including a carboxylate functional group may further include a hydroxyl group, an amine group, or combinations thereof. Examples of acids and salts of a compound including a carboxylate functional group that may further include a hydroxyl group, an amine group, or combinations thereof, include glycolic acid, amino acids, such as glycine, imidoacetic acid, and salt derivatives thereof, and ethylenediaminetetraacetic acid (EDTA) salts, such as sodium, potassium and calcium (e.g., $Na_2EDTA$, $Na_4EDTA$, $K_4EDTA$ or $Ca_2EDTA$).

Another suitable category of chelating agents, a second chelating agent, includes non-polymeric compounds having one or more functional groups selected from the group of amine groups, amide groups, hydroxyl groups, and combinations thereof, may be used in the composition. The non-polymeric compounds having one or more functional groups selected from the group of amine groups, amide groups, hydroxyl groups, and combinations thereof are free of a carboxylate functional group. Preferred compounds also include a ring structure, including both cyclic and aryl structures. One example of a preferred chelating agent having an amine or amide functional group is aniline, which has an amine group disposed on an aromatic ring structure. Additional examples of suitable chelating agents having one or more amine and amide functional groups include ethylenediamine, and derivatives thereof including diethylenetriamine, hexadiamine, methylformamide, or combinations thereof.

The polishing composition may include one or more chelating agents having one or more functional groups selected from the group of amine groups, amide groups, hydroxyl groups, and combinations thereof, at a concentration between about 0.01% and about 5% by volume or weight, but preferably utilized between about 0.1% and about 1% by volume or weight, for example about 0.3% by volume or weight.

Polymeric inhibitors, which by chemical or physical means, form a layer of material which minimizes the chemical interaction between the substrate surface and the surrounding electrolyte. The layer of material formed by the inhibitors may suppress or minimize the electrochemical current from the substrate surface to limit electrochemical deposition and/or dissolution.

Suitable polymeric inhibitors include compounds having a nitrogen atom (N), an oxygen atom (O), or a combination of the two. Polymeric inhibitors include ethyleneimine ($C_2H_5N$) based polymeric materials, such as polyethyleneimine (PEI) having a molecular weight between about 400 and about 1000000, such as between about 1000 and about 750000, of (—$CH_2$—$CH_2$—NH—) monomer units, ethylene glycol ($C_2H_6O_2$) based polymeric materials, such as polyethylene glycol (PEG) having a molecular weight between about 200 and about 100000 comprising ($OCH_2CH_2$)$_n$ monomer units, or combinations thereof. Examples of suitable polyethyleneimine compounds include 2000 and 75000 molecular weight polyethyleneimine. Polyamine and polyimide polymeric material may also be used as polymeric inhibitors in the composition. Other suitable polymeric inhibitors include oxide polymers, such as, polypropylene oxide and ethylene oxide/propylene oxide co-polymer (EOPO), with a Molecular Weight range between about 200 and about 100000.

Additionally, the polymeric inhibitors may comprise polymers of heterocyclic compounds containing nitrogen and/or oxygen atoms, such as polymeric materials derived from monomers of pyridine, pyrole, furan, purine, or combinations thereof. The polymeric inhibitors may also include polymers with both linear and heterocyclic structural units containing nitrogen and/or oxygen atoms, such as a heterocyclic structural units and amine or ethyleneimine structural units. The polymeric inhibitors may also include carbon containing functional groups or structural units, such as homocyclic compounds, such as benzyl or phenyl functional groups, and linear hydrocarbons suitable as structural units or as functional groups to the polymeric backbone. A mixture of the polymeric inhibitors described herein is also contemplated, such as a polymeric mixture of a heterocyclic polymer material and an amine or ethyleneimine polymeric material (polyethyleneimine). An example of a suitable polymeric inhibitor includes XP-1296 (also known as L-2001), containing a heterocyclic polymer/polyamine polymer, commercially available from Rohm and Hass Electronic Materials of Marlborough, Me., and Compound S-900, commercially available from Enthone-OMI Inc. of New Haven, Conn.

The polymeric inhibitor may be present in the composition of this invention in amounts ranging between about 0.001 wt. % and about 2 wt. %, such as between about 0.005 wt. % and about 1 wt. %, for example, between about 0.01 wt. % and about 0.5 vol %. A polymeric inhibitor of 2000 or 750000 molecular weight polvethyleneimine in a concentration of about 0.025 wt. % may be used in the composition. More than one polymeric inhibitor may be included in the residual polishing composition. Some polymeric inhibitor may be added the composition in a solution, for example, the residual polishing composition may include 0.5 wt. % PEI with a 2000 molecular weight of a 5% aqueous PEI solution and/or 0.5 wt. % XP-1296 (or XP tradename family of compounds from Rohm and Haas) with a 2000 molecular weight of a 10% aqueous XP-1296 solution.

Polymeric inhibitors may be in a dilute form manufacturing, for example, polyethyleneimine may be added to a composition from a 50% polyethyleneimine solution, so the concentration of the solution may be 0.025 wt. % and the actual polyethyleneimine concentration would be about 0.0125 wt. %. Thus, the invention contemplates that the percentages of all of the components, including the polymeric inhibitors, reflect both dilute compounds provided from their manufacturing source as well as the actual present amount of the component. Where possible, the actual amount of the component of the composition has been provided.

Alternatively, corrosion inhibitors may be used in combination with or as a substitute of the polymeric inhibitors in the composition. Corrosion inhibitors may include between about 0.001% and about 5.0% by weight of the organic compound from one or more azole groups. The commonly preferred range being between about 0.2% and about 0.4% by weight. Examples of organic compounds having azole groups include benzotriazole, mercaptobenzotriazole, 5-methyl-1-benzotriazole, and combinations thereof. Other suitable corrosion inhibitors include film forming agents that are cyclic compounds, for example, imidazole, benzimidazole, triazole, and combinations thereof. Derivatives of benzotriazole, imidazole, benzimidazole, triazole, with hydroxy, amino, imino, carboxy, mercapto, nitro and alkyl substituted groups may also be used as corrosion inhibitors. Other corrosion inhibitors include urea and thiourea among others.

The solution may include one or more pH adjusting agents to achieve a pH between about 3 and about 8. The amount of pH adjusting agent can vary as the concentration of the other components is varied in different formulations, but in general the total solution may include up to about 70 wt % of the one or more pH adjusting agents, but preferably between about 0.1 wt % and about 25 wt %. The pH adjusting agent may provide a pH between about 5.5 and about 7, such as between about 6.8 and about 7. The pH may be acidic or neutral.

Suitable compositions included herein may include between about 1 vol % and about 8 vol % of phosphoric acid, between about 1 wt % and about 5 wt % of citric acid, between about 0.1 vol % and about 1 vol % of aniline, between about 1 ppm and about 100 ppm polyethyleneimine, potassium hydroxide in an amount between about 5 vol % and about 15 vol % to provide a pH between about 3 and about 8, and deionized water. One example of a composition includes about 3 vol % of phosphoric acid, about 1 wt % citric acid, about 5 ppm of polyethyleneimine, about 0.3 vol % of aniline, between about 5 vol % and about 15 vol % of potassium hydroxide to provide a pH of about 6.85, and deionized water.

The balance or remainder of the polishing compositions described herein is a solvent, such as a polar solvent, including water, preferably deionized water. Other solvent may be used solely or in combination with water, such as organic solvents. Organic solvents include alcohols, such as isopropyl alcohol or glycols, ethers, such as diethyl ether, furans, such as tetrahydrofuran, hydrocarbons, such as pentane or heptane, aromatic hydrocarbons, such as benzene or toluene, halogenated solvents, such as methylene chloride or carbon tetrachloride, derivatives, thereof and combinations thereof.

Suitable compositions included herein may include between about 1 vol % and about 8 vol % of phosphoric acid, between about 1 wt % and about 5 wt % of citric acid, between about 0.1 vol % and about 1 vol % of aniline, between about 1 ppm and about 100 ppm polyethyleneimine, potassium hydroxide in an amount between about 5 vol % and about 15 vol % to provide a pH between about 3 and about 8, and deionized water. One example of a composition includes about 3 vol % of phosphoric acid, about 1 wt % citric acid, about 5 ppm of polyethyleneimine, about 0.3 vol % of aniline, between about 5 vol % and about 15 vol % of potassium hydroxide to provide a pH of about 6.85, and deionized water.

Alternatively, the polishing composition may include biocides for limiting biological contamination. Biocides are compound used to remove or limit the growth of microorganisms, such as bacteria or fungi, in the polishing system, for example in the fluid delivery system or on a polishing pad. Biocides may also be used to remove organic waste products produced by such organism. Biocides, including bactericide, may be present in the composition at a concentration necessary to remove or limit unwanted organic material or organisms. For example, a biocide may be present at a concentration between about 1 part per million (ppm) and about 50 ppm, for example, between about 10 ppm and about 20 ppm. The biocide can be any suitable biocide, for example isothiazolinone, and Kordek® MLX microbicide 2-Methyl-4-isothiazolin-3-one in water or Kathon® 886 biocide, both commercially available from the Rohm and Haas Company.

While the polishing compositions described above are free of oxidizers (oxidizer-free) and/or abrasive particles (abrasive-free), the polishing composition contemplates including one or more surface finish enhancing and/or removal rate enhancing materials including abrasive particles, one or more oxidizers, and combinations thereof. One or more surfactants may be used in the polishing composition to increase the dissolution or solubility of materials, such as metals and metal ions or by-products produced during processing, reduce any potential agglomeration of abrasive particles in the polishing composition, improve chemical stability, and reduce decomposition of components of the polishing composition. Suitable oxidizers and abrasives are described in co-pending U.S. patent application Ser. No. 10/378,097, filed on Feb. 26, 2004, and in which is incorporated by reference herein to the extent not inconsistent with the claimed aspects and disclosure herein.

Alternatively, the polishing composition may further include electrolyte additives including suppressors, enhancers, levelers, brighteners, stabilizers, and stripping agents to improve the effectiveness of the polishing composition in polishing of the substrate surface. For example, certain additives may decrease the ionization rate of the metal atoms, thereby inhibiting the dissolution process, whereas other additives may provide a finished, shiny substrate surface. The additives may be present in the polishing composition in concentrations up to about 15% by weight or volume, and may vary based upon the desired result after polishing. Further examples of additives to the polishing composition are more fully described in U.S. Pat. No. 6,863,797, issued on Mar. 8, 2005, which is incorporated by reference herein to the extent not inconsistent with the claimed aspects and disclosure herein.

Generally, Ecmp solutions are much more conductive than traditional CMP solutions. The Ecmp solutions have a conductivity of about 10 milliSiemens (mS) or higher, while traditional CMP solutions have a conductivity from about 3 mS to about 5 mS. The conductivity of the Ecmp solutions greatly influences the rate at which the Ecmp process advances, i.e., more conductive solutions have a faster material removal rate. For removing bulk material, the Ecmp solution may have a conductivity of about 10 mS or higher, preferably in a range between about 40 mS and about 80 mS, for example, between about 50 mS and about 70 mS, such as between about 60 and about 64 mS. For removing residual material, the Ecmp solution may have a conductivity of about 10 mS or higher, preferably in a range between about 30 mS and about 60 mS, for example, between about 40 mS and about 55 mS, such as about 49 mS.

While there are many theories as to the exact mechanism behind the Ecmp planarization process, it is believed that the planarization process occurs as follows. A passivation layer, which chemically and/or electrically insulates the surface of the substrate, is formed from the exposure of the substrate surface to the etching inhibitor, or other materials capable of forming a passivating or insulating film, for example oxidizers, etching agents and/or additives. An electrical bias is applied to enhance the electrochemical dissolution of the surface material, such as barrier materials, from the substrate surface. By use of mechanical means to disturb the passivation layer on the surface of the substrate, such as the polishing head urging the substrate against the conductive polishing article 222, a region of non-passivated material is exposed.

The process of exposing the underlying substrate surface enhances electrochemical dissolution and/or chemical interaction in these newly exposed regions. The exposed regions will remain exposed for short a period of time before the passivation layer is formed again, which thus tends to regulate the dissolution process in the various localized areas. The passivation layer is retained in areas not in contact with the conductive polishing article 222, such as recesses or valleys on the substrate surface, and thus the dissolution and chemical interaction is minimized.

One way of controlling passivation layer formation is through adjustment of the electrolyte pH. For example, the water soluble oxide, $WO_4^{2-}$ is stable under alkaline conditions. Below pH=2, the insoluble oxide $WO_3$ is stable, while in the intermediate pH range of 2 to ~6, a variety of polytungstate species form. Because the oxide formed under alkaline conditions is water soluble, it provides almost no protection, and very high removal rates are obtained with no planarization. Conversely, the insoluble oxide $WO_3$ is sufficiently tenacious to prevent any material removal by the abrasion available from Ecmp, resulting in a very low rate. By adjusting the pH of the electrolyte to an intermediate range of 5 to 7, a network of polytungstate species forms that provides a moderately tenacious surface film capable of protecting low areas while being abradable in the high areas.

Thus the present invention provides an improved method and composition for electrochemically planarizing a substrate. Table 1 presents recess data on 0.25 μm tungsten plugs using embodiments of compositions and methods presented herein. Version 1 of the electrolyte comprises phosphoric acid, citric acid, and potassium hydroxide at various concentrations. Version 2 comprises a small amount of low molecular weight polymer added to the electrolyte of Version 1. The removal rate of tungsten using the Version 1 electrolyte reaches about 1500 Å/min, and average plug recess can be as low as 250 Å after tungsten film clearance and before the TiN barrier material is removed. The average plug recess using the electrolyte of Version 2 can be as low as 150 Å after tungsten film clearance and prior to TiN barrier removal. As shown in Table 1, the method and composition advantageously facilitates efficient bulk and residual material removal from a substrate while decreasing plug recess by almost 50% compared to previous techniques. Typical average plug recess on wafers polished using a one-step process down to the barrier is about 400 Å, while it is about 250 Å for wafers that were polished using this new polishing technique with pulsed voltages. The methods and compositions are also applicable to different electrolyte chemistries and metals. Furthermore, the method allows for varying time ratios which can slow the removal process as the endpoint is approached.

TABLE 1

Recess data on 0.25 μm tungsten plugs using embodiments of methods and compositions presented herein.

| | 0.25 μm Plug Recess | | |
|---|---|---|---|
| Electrolyte | Center | Middle | Edge |
| Version 1 | 157~308 | 171~379 | 139~207 |
| Version 2 | 78~167 | 85~173 | 98~167 |

While the foregoing is directed to embodiments of the present invention, other and further embodiments of the invention may be devised without departing from the basic scope thereof, and the scope thereof is determined by the claims that follow.

What is claimed is:

1. A composition for removing at least a tungsten material from a substrate surface, wherein the composition initially comprises:
between about 1 vol % and about 8 vol % of phosphoric acid;
between about 1 wt % and about 5 wt % of citric acid;
between about 1 ppm and about 100 ppm of polyethyleneimine;
between about 0.1 vol % and about 1 vol % of aniline;
between about 5 vol % and about 15 vol % of potassium hydroxide to provide a pH between about 3 and about 8; and
deionized water.

2. A composition for removing at least a tungsten material from a substrate surface, wherein the composition initially comprises:
about 3 vol % of phosphoric acid;
about 1 wt % of citric acid;
about 5 ppm of polyethyleneimine;
about 0.3 vol % of aniline;
between about 5 vol % and about 15 vol % of potassium hydroxide to provide a pH between about 6.8 and about 7; and deionized water.

* * * * *

UNITED STATES PATENT AND TRADEMARK OFFICE
CERTIFICATE OF CORRECTION

PATENT NO. : 7,879,255 B2  
APPLICATION NO. : 11/556593  
DATED : February 1, 2011  
INVENTOR(S) : Tran et al.

It is certified that error appears in the above-identified patent and that said Letters Patent is hereby corrected as shown below:

Column 25, Line 59, please delete "Me." and insert --Mass.-- therefor;

Column 25, Line 66, please delete "polvethyleneimine" and insert --polyethyleneimine-- therefor;

Column 26, Lines 45-56, please delete

"Suitable compositions included herein may include between about 1 vol% and about 8 vol% of phosphoric acid, between about 1 wt% and about 5 wt% of citric acid, between about 0.1 vol% and about 1 vol% of aniline, between about 1 ppm and about 100 ppm polyethyleneimine, potassium hydroxide in an amount between about 5 vol% and about 15 vol% to provide a pH between about 3 and about 8, and deionized water. One example of a composition includes about 3 vol% of phosphoric acid, about 1 wt% citric acid, about 5 ppm of polyethyleneimine, about 0.3 vol% of aniline, between about 5 vol% and about 15 vol% of potassium hydroxide to provide a pH of about 6.85, and deionized water."

and insert

--Different compounds may provide different Ph levels for a given concentration, for example, the composition may include between about 5 wt% and about 15 wt% of a base, such as potassium hydroxide, sodium hydroxide, ammonium hydroxide, tetramethyl ammonium hydroxide (TMAH), or combinations thereof, to provide the desired pH level, such as between about 6.8 and about 7. The one or more pH adjusting agents can be chosen from a class of organic acids, for example, carboxylic acids, such as acetic acid, citric acid, oxalic acid, phosphate-containing components including phosphoric acid, ammonium phosphates, potassium phosphates, and combinations thereof, or a combination thereof. Inorganic acids including hydrochloric acid, sulfuric acid, and phosphoric acid may also be used in the polishing composition as pH adjusting agents. The one or more pH adjusting agents may be added the composition in a solution, for example, the residual polishing composition may include potassium hydroxide (KOH) of a 40% or 45% aqueous solution.-- therefor.

Signed and Sealed this  
Eleventh Day of October, 2011

David J. Kappos  
*Director of the United States Patent and Trademark Office*